US011030577B2

(12) United States Patent
Busey

(10) Patent No.: US 11,030,577 B2
(45) Date of Patent: *Jun. 8, 2021

(54) COMPUTER-IMPLEMENTED ADAPTIVE SUBSCRIPTION MODELS FOR CONSUMER PACKAGED GOODS

(71) Applicant: Andrew Thomas Busey, Austin, TX (US)

(72) Inventor: Andrew Thomas Busey, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/855,929

(22) Filed: Apr. 22, 2020

(65) Prior Publication Data

US 2020/0334635 A1    Oct. 22, 2020

Related U.S. Application Data

(60) Provisional application No. 62/837,064, filed on Apr. 22, 2019.

(51) Int. Cl.
*G06Q 10/08* (2012.01)
*G06Q 30/00* (2012.01)
(Continued)

(52) U.S. Cl.
CPC ........... *G06Q 10/087* (2013.01); *G06F 16/23* (2019.01); *G06F 16/9035* (2019.01);
(Continued)

(58) Field of Classification Search
CPC ...... G06Q 10/04; G06Q 10/08; G06Q 10/087; G06Q 30/0202; G06Q 30/0625;
(Continued)

(56) References Cited

U.S. PATENT DOCUMENTS 6,963,851 B1 * 11/2005 Szabo ................... G06Q 30/02
186/56
7,257,552 B1 * 8/2007 Franco ................... G06Q 10/08
705/26.2

(Continued)

OTHER PUBLICATIONS

"Integer programming" Wikipedia https://en.wikipedia.org/wiki/Integer_programming Apr. 11, 2020 (7 pages).
(Continued)

*Primary Examiner* — Andrew Joseph Rudy
(74) *Attorney, Agent, or Firm* — Pillsbury Winthrop Shaw Pittman, LLP

(57) ABSTRACT

A database comprises user information records for users subscribing to one or more goods through a subscription service. In some aspects a user record may contain information about the user, one or more households of the user and the constituents of those households, and other information about the user, households, and/or constituents of household. User records are updated based on various signals corresponding to user feedback and amounts of provided goods and utilized in iterative training of consumption models by which consumption of different goods is determined based on household properties. The consumption model outputs a predicted consumption of goods for a household and amounts of goods are translated into one or more SKUs for fulfillment by the subscription service.

61 Claims, 9 Drawing Sheets

(51) Int. Cl.

| | |
|---|---|
| *G06K 9/62* | (2006.01) |
| *G06F 16/9035* | (2019.01) |
| *G06F 16/23* | (2019.01) |
| *G06N 20/00* | (2019.01) |
| *G06N 5/02* | (2006.01) |
| *G06N 5/04* | (2006.01) |
| *G06Q 10/04* | (2012.01) |
| *G06Q 20/12* | (2012.01) |
| *G06Q 30/06* | (2012.01) |

(52) U.S. Cl.
CPC ......... *G06K 9/6218* (2013.01); *G06K 9/6256* (2013.01); *G06N 5/02* (2013.01); *G06N 5/04* (2013.01); *G06N 20/00* (2019.01); *G06Q 10/04* (2013.01); *G06Q 10/083* (2013.01); *G06Q 10/0875* (2013.01); *G06Q 20/127* (2013.01); *G06Q 30/016* (2013.01); *G06Q 30/0633* (2013.01)

(58) Field of Classification Search
CPC ........... G06Q 30/0633; G06Q 10/0875; G06Q 10/083; G06Q 30/016; G06Q 20/127; G06Q 30/06; G06Q 20/12; G06K 2017/0051; G06K 9/00496; G06K 9/6256; G06K 9/6218; G06F 16/9035; G06F 16/23; G06N 20/00; G06N 5/02; G06N 5/04
USPC .................................... 705/26.1, 26.8, 28, 29
See application file for complete search history.

(56) References Cited

U.S. PATENT DOCUMENTS

| | | | | |
|---|---|---|---|---|
| 7,346,534 | B1* | 3/2008 | Martin | G06Q 10/04 705/7.22 |
| 7,788,119 | B2 | 8/2010 | Najmi | |
| 8,229,866 | B2* | 7/2012 | Alaniz | G06K 9/00496 706/12 |
| 8,494,893 | B2 | 7/2013 | Oya | |
| 8,666,791 | B1* | 3/2014 | Fedele | G06Q 30/0605 705/7.11 |
| 8,666,847 | B1* | 3/2014 | Blank | G06Q 10/08 705/28 |
| 8,738,421 | B1* | 5/2014 | Ali | G06Q 30/0202 705/7.29 |
| 9,002,728 | B2* | 4/2015 | Carpenter | G06Q 30/0224 705/14.25 |
| 9,495,696 | B2* | 11/2016 | Traina | G06Q 30/0635 |
| 9,710,755 | B2* | 7/2017 | Srivastava | G06N 7/005 |
| 9,934,294 | B2* | 4/2018 | Srivastava | G06F 16/27 |
| 10,026,064 | B2* | 7/2018 | Thomas | G06F 9/44505 |
| 10,235,686 | B2* | 3/2019 | Kohn | G06Q 10/087 |
| 10,275,740 | B2* | 4/2019 | Alvo | G06Q 10/087 |
| 10,332,032 | B2* | 6/2019 | Chowdhary | G06N 20/00 |
| 10,373,105 | B2* | 8/2019 | Feng | G06Q 30/0202 |
| 10,453,026 | B2* | 10/2019 | Ray | G06Q 30/0202 |
| 10,540,155 | B1* | 1/2020 | Spracklen | G06F 8/35 |
| 10,547,809 | B2* | 1/2020 | Traina | G06Q 10/1095 |
| 10,565,551 | B2* | 2/2020 | Shi | G06N 3/0481 |
| 10,614,501 | B2* | 4/2020 | Fredrich | G06Q 30/0625 |
| 10,628,446 | B2* | 4/2020 | Srivastava | G06Q 30/00 |
| 10,650,434 | B2* | 5/2020 | High | G06Q 30/0633 |
| 10,708,135 | B1* | 7/2020 | Elliott, IV | H04L 41/0893 |
| 10,719,860 | B2* | 7/2020 | Bifolco | G06F 16/2379 |
| 10,891,587 | B2* | 1/2021 | Busey | G06Q 30/016 |
| 2013/0173402 | A1 | 7/2013 | Young et al. | |
| 2014/0279208 | A1 | 9/2014 | Nickitas et al. | |
| 2015/0066767 | A1 | 3/2015 | Walker et al. | |
| 2016/0063581 | A1 | 3/2016 | Traina et al. | |
| 2016/0171436 | A1 | 6/2016 | Ladden et al. | |
| 2017/0262926 | A1 | 9/2017 | High et al. | |
| 2018/0144290 | A1 | 5/2018 | Alvo et al. | |

OTHER PUBLICATIONS

"Bin packing and scheduling" Sanders/van Stee: Approximations- und Online—Algorithmenhttp://algo2.iti.kit.edu/vanstee/courses/les7b.pdf Oct. 25, 2007 (45 pages).

Dove et al., "What is RCS messaging? Everything you need to know about the SMS successor," Digital Trends https://www.digitaltrends.com/mobile/what-is-res-messaging/ Dec. 12, 2019 (27 pages).

"How to Maximize Your Savings with Amazon Subscribe & Save," Mashup Mom Blog https://www.mashupmom.com/maximize-savings-amazon-subscribe-save/ Jan. 7, 2017 (27 pages).

Non-Final Office Action dated Aug. 11, 2020 in related U.S. Appl. No. 16/878,786 (9 pages).

Notice of Allowance in related U.S. Appl. No. 16/878,786 dated Nov. 24, 2020 (11 pages).

* cited by examiner ity. The present application is related to U.S. patent application Ser. No. 16/878,786, which is projected to issue on 12 Jan. 2020 with U.S. Pat. No. 10,891,587 and is a later-filed continuation of the present application.

COMPUTER-IMPLEMENTED ADAPTIVE SUBSCRIPTION MODELS FOR CONSUMER PACKAGED GOODS

CROSS-REFERENCE TO RELATED APPLICATIONS

The present application claims the benefit of U.S. Provisional Application No. 62/837,064, filed on 22 Apr. 2019, which is incorporated by reference herein in its entirety. The present application is related to U.S. patent application Ser. No. 16/878,786, which is projected to issue on 12 Jan. 2020 with U.S. Pat. No. 10,891,587 and is a later-filed continuation of the present application.

BACKGROUND

1. Field

The present disclosure relates to computer-systems for managing subscriptions and, more particularly, adaptive subscription modeling for predicting user consumption of goods fulfilled by subscription.

2. Description of the Related Art

Existing computer systems for managing subscriptions work well in some domains, but are deficient in others. Many companies provide subscriptions for goods and services. Canonical examples include subscriptions for entertainment, like media subscription services by which users may pay a monthly fee to access repositories of media files like music and videos. Subscriptions work very well for such services because, if a user sees value in the service, the user subscribes, and if that user no longer sees value in the service, the user simply unsubscribes. Value of such a service is typically viewed by a user in terms of the amount and quality of content in view of the monetary cost and, provided the user's usage exceeds some minimum threshold, is relatively agnostic to how frequently the user utilizes the service.

In contrast, computer-implemented subscription plans for physical goods are more challenging. In many cases, companies providing subscriptions for physical goods, and especially consumable physical goods, often provide such tangible goods to the user at a fixed frequency. Typically, the user specifies the amount of a consumable good they wish to receive and a frequency (e.g., weekly, monthly or bi-monthly) at which they wish to receive a same order of the consumable good. For example, a user may elect to receive a pound of coffee every week. In turn, the company ships a pound of coffee to that user on a weekly basis as specified by the frequency elected by the user.

Unlike subscriptions for intangible products, for which consumers are relatively agnostic as to whether they utilize the service more or less frequently over a given period of time, like a given week or month, subscriptions for consumable goods are often highly dependent on the amount of the good the user consumes over a given period of time. For example, a coffee subscriber that under-consumes eventually accumulates a kitchen full of coffee. The under-consumer may respond by decreasing the amount or frequency for a delivery. Alternatively, over-consumers may run out periodically. In turn, an over-consumer may increase the amount or frequency (typically until they receive far too much of the good), or obtains more of that good outside of the subscription. In either instance, users are burdened with the cognitive load of tinkering with the amount or frequency and risk of receiving too much of the good or having too little. This very often results in a user cancelling a subscription for a consumable good because the proposed convenience of the subscription to the good cannot be realized by the user. Although the above example is relative to coffee, it extends to the gamut of consumable goods which users are apt to order online or that the user obtains locally on an as-needed basis.

SUMMARY

The following is a non-exhaustive listing of some aspects of the present techniques. These and other aspects are described in the following disclosure.

Some aspects include a technique for adaptively determining user consumption of packaged goods with a consumption model to increase the accuracy of an amount of a good and a frequency with which that amount should be delivered to fulfill a subscription.

Some aspects include a database comprises user information records for users subscribing to one or more goods through a subscription service. In some aspects a user information record may contain information about the user, one or more households of the user and the constituents of those households, and other information about the user, households, and/or constituents of household. In some aspects a user information records may contain feedback signals, which maybe received directly or indirectly from the user and/or other constituents of a household of the user. In some aspects a user information record may contain information about the goods to which the user subscribes for one or more households, such as an amount of a good, when that good was last delivered and where that good was last delivered, and a schedule of future deliveries of goods.

In some aspects the database of user information records is seeded with a plurality of user information records for initial training of a consumption model. In some aspects a user information record includes information such as household properties, goods preferences, and fulfilled orders of goods. Fulfilled orders of goods for seeding may include information about goods purchased by the user outside of the system as well within the subscription service such that consumption of a good may be inferred from the frequency and quantity at which the user purchases the good. For example, the obtained collection of user information records may utilized to train a consumption model operable to infer consumption of a good based on household properties and goods preferences of a user. An initial consumption model may be trained from at least some of the user information records seeded in the database, such as a training set of user information records. The remaining records seeded in the databased may be utilized as a verification set to determine an accuracy of the model, such as by predicting a consumption of goods of a user based on the user information record of the user and comparing the predicted consumption of goods with the information about goods purchased by the user.

In some aspects, as users corresponding to the seeded records engage with the subscription service, those records may be updated based on goods fulfilled by the subscription service, such as to include user feedback indicative of preferences for goods and quantities of goods. In some aspects, the feedback is be operable to adjust consumed quantities of fulfilled orders of goods. Updated user information records may be utilized to iterate training of consumption models to generate an updated consumption model operable to more accurately infer consumption of a good based on household properties and good preferences of a user. In addition, updated user information records may be utilized to iterate training of consumption models based on additional account information, like user provided feedback and fulfilled orders of goods, to generate a consumption model operable to infer future consumption of a good for existing users based on those additional factors. In some aspects, user-specific consumption models may be generated and updated as a given user receives goods and provides feedback on the consumed quantities of those goods fulfilled by the subscription service.

In some aspects, an initial consumption model outputs a predicted consumption of goods for a new user based on household properties and goods preferences of the user. In some aspects, a consumption model outputs a predicted consumption of goods for an existing user subsequent to the existing user receiving at least some goods and providing at least some feedback on the consumed quantities of those goods fulfilled by the subscription service. In some aspects, a user-specific consumption model is generated for the user. In some aspects, a consumption model or user-specific consumption outputs a predicted consumption of goods and a minimum amount of goods to fulfill in a next shipment to meet the predicted consumption of goods over an interval for an existing user.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
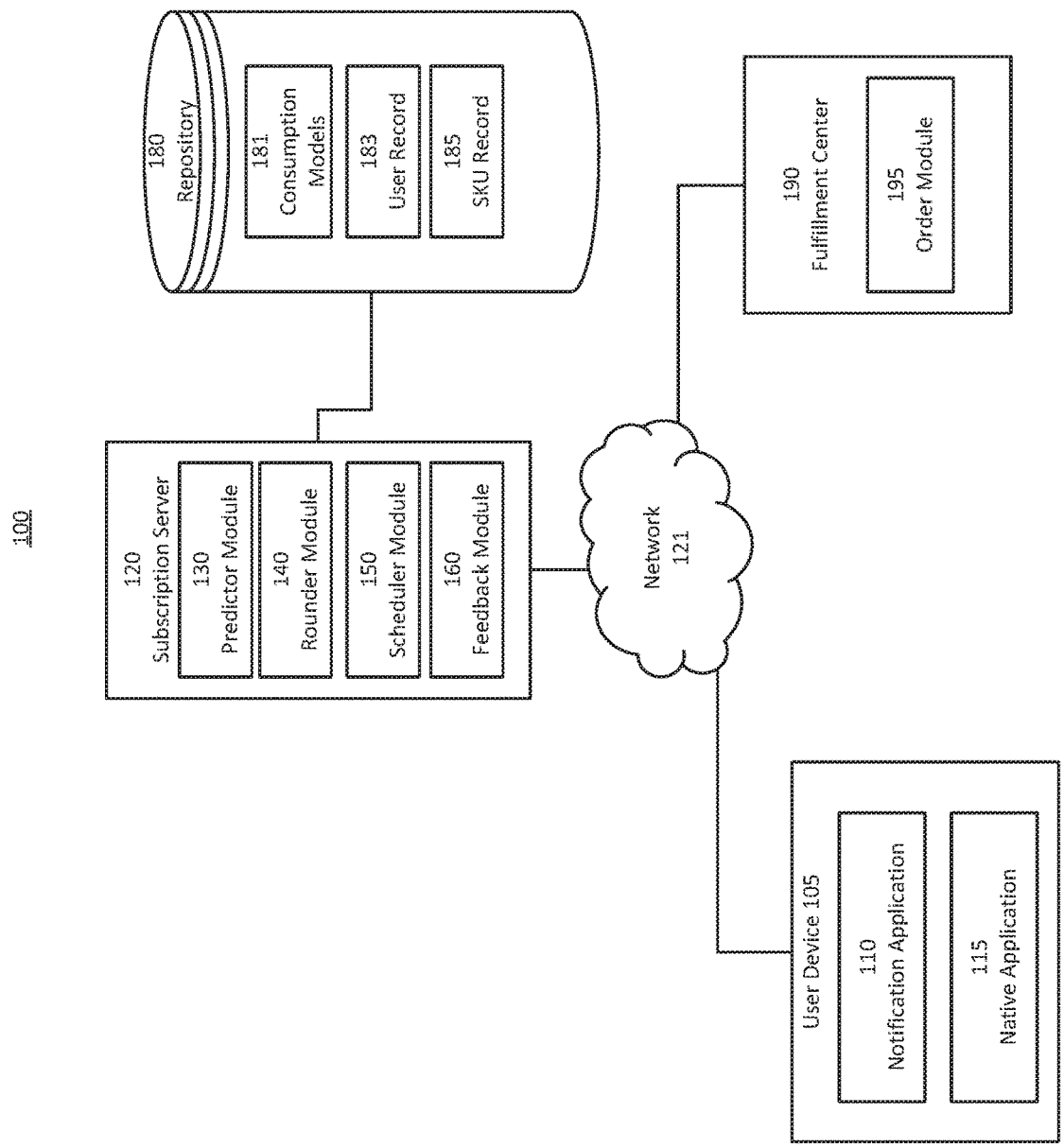
FIG. 1 illustrates an example of a computing environment within which the present techniques for adaptive subscriptions may be implemented, in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of machine learning, human-computer interaction, and operations research. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 illustrates an example computing environment 100 configured to implement an improved form of adaptive subscriptions expected to exhibit less over-provision, less under-provision, and provide interfaces to adjust the service that imposes a lower-cognitive load than traditional UI's, relative to traditional computer-implemented subscription services. Some embodiments may ingest various attributes of a user or user's household (e.g., more than 3 demographic attributes, or more than 5 demographic attributes of the user's household) and predict a rate of consumption of each of a plurality of goods (e.g., within the household) for which the user may subscribe. Some embodiments may configure subscriptions based on such predictions, and some embodiments may afford an interface by which feedback may be provided to adjust the subscriptions with relatively little effort from the user. Some embodiments may re-train models by which predictions are made based on such feedback. Some embodiments may further optimize subscriptions within volumetric weight constraints of various modes of delivery. These and other features are described in greater detail below with reference to various example implementations.

In some embodiments, the computing environment comprises a number of user devices 105 and a subscription server 120 (which may be implemented as a collection of services running on various hosts, each having executing its own server process, as part of a server-system). Examples of user devices may be computing devices such as personal computing devices like a desktop computer or mobile devices such as mobile phones, tablets, laptops, and the like. Examples of user devices may also include personal assistant type computing devices that users utilize throughout their home. One user device is shown, but commercial use-cases are expected to service more than 100 or more than 1,000 concurrent sessions with more than 10,000, more than 100,000, or more than 10 million users in a userbase that is distributed geographically over more than 10,000 square kilometers, e.g., over the United States.

Functionality pertaining to those user computing devices 105 may differ depending on type. For example, a mobile phone may receive a notification via text message (e.g., a short messaging service or SMS) over a network 121. Similarly, a mobile phone may receive a notification via a rich communication service, or RCS, which is also a communication protocol between mobile-telephone carriers and between phone and carrier, and which may provide additional features over SMS type messaging, such as interactive multimedia, like interactive polls or forms, or other prompt or user interface elements which a user may interact with via selection within that user interface element or in response to the prompt (e.g., via voice, image capture, or other sensor reading) as opposed to a direct input of a text response as is the case with SMS. In various embodiments, notifications may be generated for a particular service.

Various ones of those user computing devices may include a native application 115 that is executed to provide functionality like that described above. In some cases that native application is an RCS messaging application executing on a mobile device. In some cases that native application 115 is a messaging application that also includes support for proprietary services like iMessage, Google Messenger, and the like. In some cases, different user device 105 may utilize different native applications 115 supporting respective messaging services. For example, some devices may utilize iMessage while some other devices may utilize Google Messenger, and some devices may utilize cross-platform messaging applications or notification services in addition to proprietary services. In some cases, a notification application 110 (which may be an example of a native application) is distributed by the provider of the subscription service and configured to receive notifications on a notification service, which may be a native notification service, like a push notification service, subscribed to by the user computing device 105 for receiving push notifications over a network 121. Examples of notification services may include Google Cloud Messaging Service, Apple Push Notification Service, Firebase Cloud Messaging, and the like. In some cases, a notification service is a cross-platform notification service and a user may select by which service (e.g., whether notifications should be received via a notification application 110 on a notification service or via a native application 115, like a messaging application, on a messaging service) available to their user computing device. In some embodiments, a user may elect one or more ways in which notifications (e.g., via notification service or messaging service) should be received on (e.g., during a registration process with the subscription service). In some cases, an application (e.g., a notification application 110 or a native application 115) may periodically poll a server to retrieve notifications or other data.

Example applications (e.g., a notification application 110 or a notification application 115) may transmit information to a server based on user input, such as text, audio, or image data or selection (e.g., of an option within a user interface), which may be provided by the user in response to a received notification. For example, a user may provide input in response to a notification (e.g., "Do you need more paper towels?") requesting an indication of a status on a quantity of a good. Additionally, an application (e.g., a notification application 110 or a notification application 115) may transmit information to a server based on user input, like those types of input noted above, when deemed necessary by the user at times other than when prompted by a notification. For example, a user may provide input (e.g., "Out of paper towels.") indicating a status on a quantity of a good without being prompted to provide such input by a notification. In various embodiments, a user may provide input indicating a status on a quantity of a good in natural language—like text or speech (which may be converted to text)—that may be processed at a server to infer the status on the quantity of the good (e.g., a value for a field corresponding to paper towels for the user's household based on the input "out of paper towels").

In some embodiments, a notification may include data or cause an application (e.g., application 110 or 115) executing on the user device 105 retrieve data corresponding to the notification for presentation to the user within an interface (e.g., of the application or of the operating system) on the user computing device. For example, a notification may be a RCS message that is displayed within a user interface of a RCS messaging application (e.g., a native RCS messaging application 115). In another example, the notification may be a push notification on a push notification service, which the user may select to launch the corresponding application (e.g., notification application 110) to display notification data within a user interface of the application (or, when launched, the application may retrieve data corresponding to the notification for display within the interface). In some cases, the notification may include some data which indicates to the user what the notification pertains to, like a preview or abbreviated portion of the received notification, which may be displayed in connection with the push notification. Richer (or additional) data may be displayed or retrieved and displayed when the user selects the push notification or otherwise launches the corresponding application to view the notification. In some embodiments, a notification may include audio or visual elements. For example, a notification may include one or more visual elements corresponding to user interface elements or corresponding to options for use selection. In another example, a notification may include audio data, which the user device may playback to the user, and the user may provide a response to the notification via voice response. In some cases, notifications including audio data may be generated for transmission to home or personal assistant type devices which may or may not include visual displays and, optionally, another corresponding notification (e.g., with text or visual elements) may be generated and transmitted to another device of the user which includes a display (e.g., a mobile phone or other device) or posted to an account of the user which the user may access (e.g., by logging into a native application or to a web portal via a web browser).

Thus, different types of notifications may be applicable to alert and communicate information to a user and users may respond to those different types of notifications in different ways, such as via different interfaces which may rely on visual, audio, audio visual elements, or a combination thereof. Similarly, the user interface may be responsive to user input, like a selection, voice command, captured image, and the like. For example, some user input may be processed at least in part by the user computing device 105 to determine a result of the user input and update the user interface to indicate the result, like a speech to test result and optionally a determined selection based on the result, result of a selection within the user interface, or result of processing image data and optionally a determined selection based on the result. In some embodiments the user may confirm the result via the interface of the user computing device, such as by selection of a user interface element, voice command, and the like to submit the result (e.g., as a user response to the notification). In some embodiments, a determined result may be considered as confirmed by the user if not altered within a set period of time subsequent to the user input.

In various embodiments, a result may be a status on a quantity of a good determined by the user computing device 105 based on the user input, which may be provided by the user in natural language. In some embodiments, determination of results by a user computing device 105 may be dependent on its capabilities or configuration. As such, in some cases, the user computing device 105 may transmit user provided input (e.g., audio) to a server (that may be a different or same server from that which the user computing device transmits the result) that is configured to determine a speech to text result based on the user provided audio input and returns the text to the user computing device. Thus, in some embodiments, a user computing device 105 may transmit some types of user input to a server which may process the input to determine a result which is returned to the user computing device for confirmation. Once a result is considered confirmed or confirmed by the user, the user computing device 105 may transmit the result to a server (e.g., subscription server 120) or in a way such that the subscription server 120 may obtain the result. The particular way in which the result is submitted may depend on the notification type, and may include but are not limited to RCS message, SMS message, HTTP(S) response, API responses, and like by which result data may be communicated over a network 121. Thus, the network 121 may include the Internet, telephone provider networks, and other service provider networks configured to communicate information like that discussed herein.

Examples of a subscription server 120 may include one or more server computing devices configured to effectuate operations for providing adaptive subscriptions that exhibit less over-provision, less under-provision, and interfaces that impose a lower-cognitive load for subscribers. Embodiments of a subscription server 120 may include one or more modules, such as those illustrated by FIG. 1, which may be configured to perform various functions like those disclosed herein. The disclosure should not be construed to limit disclosed functionality to a given module or element as embodiments contemplate distributing those functions differently, such as among different servers, additional, fewer, or other modules, or other logical structures. Example modules according to various embodiments described herein may include, but is not limited to, predictor 130, rounder 140, scheduler 150, and feedback 160 modules.

Various embodiments may include one or more application programming interfaces (APIs) by which data within the example environment 100 may be communicated between various entities. Some APIs may facilitate the presentation of data to users by user devices and receive results of user inputs to user devices. For example, an application 110, 115 executing on a user device 105 may receive information which may be displayed within a user interface (e.g., as one or more UI elements) or otherwise communicate the information to a user in response to receiving the data or other instructions from an API. In another example, an application 110, 115 executing on a user device 105 may cause the user device to transmit user input data or results to the API.

In some embodiments, the subscription server 120 may include one or more APIs to facilitate communications with user devices 105. In some cases, the subscription server 120 may include an API configured as a translation layer to facilitate the exchange of data between one or more modules of the subscription server and one or more external APIs. Some examples of external APIs may include various APIs of services corresponding to respective applications 110, 115 executed by user devices 105. In some example embodiments, the translation layer API may communicate notification data to an external API (e.g., according to a schema of the external API) that causes the external API to transmit instructions or data to a user device 105 (e.g., such that the user device presents a corresponding notification). For example, the translation layer API may receive or obtain notification data from one or more modules of the subscription server 120, such as notification data, in a schema of the subscription system 120 and translate that data into a schema compatible with an external API. In some example embodiments, the translation layer API may receive data like user input data or other results (which may pertain to a notification) from the external API (e.g., in the schema of the external API) based on data communicated to the external API by a user device 105. The translation layer API may translate data received in a schema of an external API into a schema of the subscription system 120.

Thus, for example, communications between the subscription server 120 and user devices 105 may be facilitated across different types of user devices executing various different applications 110, 115 compatible with various different services in a consistent fashion. The above should not suggest that such an API cannot communicate information to some user devices 105 without utilizing an external API. For example, a translation layer API or other API of the subscription server 120 may communicate notification data to an application 110, 115 or receive data transmitted by the user device 105. Additionally, in some example embodiments, the above described functionality of external APIs may be performed by the subscription server 120 or other first party server with which the subscription server 120 communicates (e.g., rather than an interface with a $3^{rd}$ party service). Further, the disclosure contemplates compatibility with one or more, such as two, or three, or five, or more $3^{rd}$ party services, such as via a translation layer API to support the gamut of different user devices 105 and applications 110, 115 that users utilize and configure notifications differently for respective devices, services, or applications.

In some embodiments, a database 180 stores various data processed by one or more modules and stores results of the processing of that data or other data by one or more modules in one or more data structures. In some embodiments, results of one or more processing steps are stored in new data structures (e.g., like one or more models, like a consumption model) that are different from the input data structures (e.g., training data, such as consumption data for training a consumption model), examples of which are discussed in greater detail below.

The data stored in the repository 180 within one or more data structures may include data obtained from users, such as about their households, determined about users and their households, and contextual data which may be utilized in such determinations. In some example embodiments, data pertaining to a user and the user's household may be stored within a user record 183. Example properties for a user or household may include information about who lives in the household with a corresponding age (or age bracket) and gender for each member of the household; whether any pets are present in the household with a corresponding pet type and size for each pet; type of housing unit such as apartment, high rise, neighborhood, or city; features of the housing unit such as a number of bathrooms or bedrooms; frequency of guests; whether each of one or more household members works or stays at home and with what frequency; and whether meals are made or consumed in household and with what frequency. In some embodiments, a user record 183 may store data about a user's or user's household preference for different brands or types of goods. Example properties for user or household preference may include whether the household members prefer name-brand name goods, in-house brands, discount brands, or environmentally friendly goods; which types of items the user desires to subscribe to for the household; and sizes of home appliances (e.g., a small/medium/large trash or recycling bin) that correspond to any of the types of items for subscription. A user may provide a subset or all of the above information about properties of a household and preferences for items upon registration. In some embodiments, a reduced set of factors determined to be most indicative of consumption of goods and preferences of goods may be requested from the user and determined based on other information obtained during a registration process. Additional household properties and item preferences of the user that are indicative but less so than the reduced set of factors may be obtained gradually, such as by direct inquiry and corresponding user feedback or inference through analysis of indirect user feedback and consumption patterns of the household.

Some embodiments contemplate additional types of information or properties pertaining to a user or user's household. For example, a user record 183 may include information about user activities, like which members of a household are active in sports and which sports, whether the household includes any exercise equipment, or any hobbies of the members, like camping, painting, home improvement, or home mechanic. In some embodiments, such information may be obtained via calendar integration (e.g., user permission to access a calendar of the user and optionally other members of the user's household, such as permissions to periodically obtain data via a $3^{rd}$ party API of a user calendar application), or via user input, such as by the user indicating context within user feedback (e.g., "we are going camping next month and need more paper towels" or "we need more paper towels during soccer season" and the like).

Some information or additional information may be determined for one or more users or user's households, such as location of the household (e.g., based on a shipping address for subscribed goods), which may include a city, state or zip code or GPSs coordinates and corresponding climate. In some cases, more granular climate information may be determined, such as based on historical values (e.g., of the past month or months), current values (e.g., which may be stored to maintain historical values), or futures values (e.g., forecast for next month) obtained from one or more sources, like $3^{rd}$ party sources storing climate data based on a city, state or zip code or GPS coordinates and which may include an API by which such information may be queried. Some embodiments may maintain records of such information, such as within the repository 180, by querying a $3^{rd}$ party source periodically, or obtain the information in association with a processing step, like when determining how much of a good a household might consume over a future period of time, or when determining (or evaluating) how much of a good a household consumed (or might have consumed) over a past period of time, such as by querying $3^{rd}$ party source(s) for historical values or future values to obtain values for processing.

In some embodiments, a user record 183 may be updated to include other information described herein, such as information indicative of goods provided in fulfilled shipments, user feedback indicative of status on amounts of goods, predictions for next shipments, and predictions for bulk shipments, all which are discussed in greater detail below. User records 183 may be updated based on obtained data and results determined by one or more modules. In turn, updated user records 183 may be processed by one or more modules in subsequent determinations. For example, a user record 183 including one or more updates may be accessed and processed by one or more modules to determine which goods and amounts of those goods to fulfill in a next order (e.g., after the user has received at least one shipment and optionally provided at least some feedback indicative of a status of goods to which the user subscribes). In other words, various processes described herein may be executed periodically (e.g., iteratively over the course of a user's subscription) to estimate household consumption rates of different goods and determine next or future shipments of different goods based on those consumption rates. Furthermore, estimated household consumption rates may be determined based on the various properties maintained within a record corresponding to the user's household and other contextual factors affecting household consumption rates (e.g., climate information, seasonal sport activities, and the like).

In some embodiments, an example user record 183 may include at least some household properties and at least some goods preference properties. The household and goods preference properties may be stored in a vector, vectors, matrix, or other data structure like a linked list or tree. For example, Household: <Vector> may be a data structure including a feature vector describing various properties of the household. An example vector for an example user having a "Household1" may include information like Household1: <M1, . . . , Mn,P1, . . . Pn,City/Neighborhood/Condo/Apartment,#Bathrooms,#Bedroom s,etc.> where one or more entries M1 to Mn may be vectors descriptive of respective members of the household e.g., <Gender, Age in years or months, etc.>, one or more entries P1 to Pn may be vector descriptive of respective pets of the household e.g., <Cat/Dog/etc.,Large/Small,Age in years or months,etc.>, an entry for a housing unit type, properties of that unit, and so on. Various goods preference properties may also be encoded in the vector or other data structure, such as whether the household prefers premium, value or budget products, a particular brand of products, environmentally friendly products, and the like. Other properties may also be encoded in the vector or other data structure, such as whether a given member of the household mostly stays home (e.g., works from home and the like) or does not (e.g., works from an office, goes to school or daycare, and the like). Other contextual properties may also be encoded in the vector or other data structure, such as a location of the household, whether the household frequently has guests, when one or more members of the household will be out of town, and the like. Some properties may be determined based other properties, for example, the location of the household may be processed to determine one or more climate information properties, like a number of days with precipitation (e.g., during a past consumption period) or an estimated number of days with precipitation (e.g., during a next or future consumption period), and which may be updated periodically within the user record (e.g., prior to or in association with a processing of a user record to estimate consumption and determine amounts of respective goods to ship).

The data stored in the repository 180 within one or more data structures may include data about goods, such as goods within a category of goods users may subscribe, like paper towels, toilet paper, and the like. The data about goods may be obtained from distributors or suppliers and include data about the goods they provide or manufacture and the various configurations in which those goods are packaged (e.g., quantities and the like), and further include data determined about the goods. In some example embodiments, data pertaining to a good may be stored within a SKU (stock keeping unit) record 185. In some example embodiments, a SKU record 185 may pertain to an individual SKU of a good, which is not to suggest that such a SKU record may not reference other related SKU records, such as those corresponding to a same good but for which multiple SKUs (and thus multiple records) may exists due to different SKUs being assigned to different packaging of the same good in different ways (e.g., different qualities). In some example embodiments, a SKU record 185 may contain two or more SKUs corresponding to an individual good for which there exists multiple SKUs (e.g., a particular good may be packaged in different ways and each different packaging, such as for different quantities of the same good, may have a different SKU but be included or referenced by a same SKU record 183). In some cases, both aforementioned configurations or other configurations of SKU records 185 may be utilized.

In some embodiments, a SKU record 185 includes, such as for a given good, a consumption factor. A consumption factor for a given good may be determined based on feedback signals indicative of consumption of the good relative to feedback signals indicative of consumption of another good of the same type. For example, if a first household receives a first brand of paper towels and a second household receives a second brand of paper towels, and the households are similar, yet the second brand of paper towels is consumed at a greater rate—such as per unit or other metric (e.g., number sheets)—a respective consumption factor may be adjusted to account for such differences (e.g., effectiveness of different brands of products). In some cases, the consumption factor is adjusted relative to a baseline unit of measure, which may be tied to a particular SKU (or SKUs) corresponding to a given good (e.g., brand X extra strong paper towels). In another example, if a consumption model estimates a same consumption of the good for the two households, the consumption factor for a given good (e.g., the first brand or the second brand of paper towels) may be adjusted based on the estimated consumption unit (e.g., as determined by a consumption model) which some goods (e.g., the first brand in the example) outperform and others (e.g., the second brand in the example) underperform (e.g., as determined by feedback signals indicative of consumption of the goods relative to the estimated consumption unit). In other words, the consumption factor may account for variation between a same type of good for which there are available different brands or product lines on a more granular level. In some embodiments, the consumption factor for a good may be applied subsequent to estimating a baseline consumption for the type of good (e.g., by a consumption model). In some embodiments, the consumption factor may be incorporated in training records for training a model that accounts for brand or product line variation to more accurately estimate a household's consumption of a particular preferred brand (or product line) of a good.

The data stored in the repository 180 within one or more data structures may include one or more models or model data, such as for one or more consumption models 181. In some embodiments, consumption models 181 may include executable code, like a module, which may be loaded into a memory and executed by a processor and provide one or more outputs based on one or more inputs. In some embodiments, consumption models 181 may include the various weights or configuration data for a model which may be loaded into memory to configure a model to provide one or more outputs based on one or more inputs and the loaded weights or configuration data. Various examples of models are discussed herein and the data corresponding to those modeling techniques or computer models generated by those modeling techniques may be stored within the repository 180. For example, a consumption model 181 (or model data) may be generated or otherwise determined based on one or more training operations. In various embodiments, training techniques may be iterative and executed when new or updated training data is obtained or identified.

In accordance with at least some techniques described herein, a model may be trained on various data stored within the repository 180, which is not to suggest that some data, such as climate or calendar data, which some embodiments may utilize during model training cannot be maintained in other repositories and obtained (e.g., by the subscription server 120 or other server) for training operations. The training records may be selected from user records 183, or a subset thereof. For example, in some embodiments, the repository 180 may include a number of seed user records 183, which may not correspond to an actual registered user, but rather are based on determinations of consumption of different goods. For example, a limited set of individuals or households may record their usage of various goods over a period of time, and those individuals or households may optionally indicate one or more aspects that factored into that usage. For example, an individual may indicate that they used X amount of paper towels, Y amount of baby wipes, and amounts of other products over the course of a period of time. The individual may also report household consumption, and also indicate user of certain products with respect to pets, a baby, children, etc. to report on factors like those which registered users may also encounter.

The reported consumption of the different products may be parsed to indicate consumption of one or more individuals (e.g., by age, gender, sports/hobbies, etc.) and for different household properties (e.g., by high rise, suburban house, pets, no pets, etc.) based on the properties of the reporting individuals and their households (e.g., based on the granularity with which the consumption is reported). In turn, seed records may be constructed from combinations of the parsed informational components. For example, a number of seed records may be generated for different representative households having different combinations of properties (e.g., at least some of which were not represented in the reported consumption information) by combining the information parsed for one individual with that parsed for one or more other individuals (e.g., members of different households) along with other information parsed for household properties, like pets, housing unit type size, and the like. Thus, for example, from a relatively limited set of information reported information, different representative households may be constructed from informational components extracted from or determined about the reported information, such as to create a set of seed records that include properties spanning those which the training process of the model should take into account. In one example, reported consumption information for a first household with two adult members, a second household with an adult member having a dog, and a third household with two adult members and two children may be parsed to determine consumption of different goods by an adult, a child, and for use in relation to a dog, and those informational components may be combined to generate a seed record for a household having two adult members, a single child, and a dog for which consumption was not being reported. In another example, the first household (and other similar households) may be compared to the second household (and other similar households) to parse out consumption differences that arise from dog ownership, or compared to the third household (and other similar households) to parse out consumption difference that arise from having children in the home.

In some embodiments, the training records include a training set and a validation set. For example, a first subset of user records 183 may be selected as a training set and a second subset selected as a validation set. Some embodiments may bootstrap a model training process with relatively few training records (such as with seed records like those described above) and identify additional training records over time (e.g., based on user feedback corresponding to predicted consumption relative to actual consumption). In some cases, one or more user records 183 may be identified as training records, such as by a module of the subscription server 120, like by the feedback module 160 based on at least some feedback received from users corresponding to the respective records.

In some embodiments, a predictor 130 receives or obtains as input a user record and outputs a predicted consumption of goods corresponding to the user record. For example, the predictor 130 may determine a predicted consumption of goods for the household of the user based on one or more household properties included in the user record. The predictor 130 may receive or obtain a user record for determining a predicted consumption of goods after a registration process during which at least some properties are populated for the user record, periodically after one or more updates to properties of the user record, or otherwise prior to or in association with a next shipment based on predicted consumption. As described above, user records 185 may be stored within the database 180 and contain data like that described above.

In some embodiments, a user record is generated for a user (e.g., corresponding to the user's household) during a user registration process with the subscription server 120 in which the user elects to subscribe to one or more goods. The registration process may include obtaining user information which may include, but is not limited to, properties of one or more households of the user and item preferences of the user. In reference to discussion of a new user, a first iteration of processing the user record including an initial set of properties (e.g., those provided during registration) may be performed by the predictor 130 to determine an initial prediction of consumption for one or more goods.

During a registration process, a user describing the service may provide at least some household properties which may be processed by the predictor 130 estimate consumption of one or more goods by the household of the user. By way of example, FIGS. 3A, 3B, 3C, 3D, 3E, 3F, and 3G illustrate some examples of user interface workflow for registering a new user with a subscription service, in accordance with some embodiments. Thus, subsequent to registration, an example user record 183 for a household of the user may include at least some household properties and at least some good preferences properties. The household properties and good preference information may be stored in a data structure initialized for the user, such as in a vector, vectors, matrix, or other data structure like a linked list or tree as described above. For example, an initial Household: <Vector> may include the one or more properties provided during registration, like a feature vector describing one or more user provided properties of the household. Goods preference properties may be stored in the same or different vector or other data structure associated with the user record.

Some embodiments may obtain more or fewer properties via fewer or additional interfaces or prompts for user input, some embodiments may obtain properties different than those illustrated, such as one or more other properties discussed herein, and some embodiments may obtain additional properties than those discussed herein. Accordingly, the interfaces should be viewed as illustrative examples of household properties and not that the aspects disclosed herein are limited to only the properties illustrated otherwise discussed. Moreover, some embodiments may prune household properties (e.g., from user interfaces, prompts for feedback, or otherwise) which are determined to minimally influence consumption, or those that are superseded by some other property (e.g., in a hierarchy). For example, an indication that a household member plays sports may be superseded by another property indicative of which sports the household member plays. In some embodiments, the registration process serves to collect an initial set of properties for a household, such as a limited set, to mitigate user fatigue with the registration process, and other properties of the household may be obtained (e.g., gradually, and implicitly or explicitly) over the period of time that the user maintains the subscription for the household.

The predictor module 130 may take as input a user record including at least some household properties (e.g., like an initial set of household properties) and predict an amount of consumption of different goods over a given period of time, such as a week, two weeks, a month, or a year. Although embodiments discussed below reference a monthly time period for ease of explanation, other more granular periods or longer periods may be specified, either by default or responsive to information within the user record. In some cases, the period corresponds to a delivery schedule which may be set by an administrator of the subscription server or selected by a user from one or more delivery schedules offered. For example, a bi-weekly period of time may be selected for (or by) a household with members living in a small home with minimal storage space or other factors and a relatively high predicted consumption (e.g., due to children or pets). In contrast, for a household with similar consumption but more storage area (e.g., living in a larger home) a monthly period of time may be selected. A monthly schedule may be selected for (or by a user of) a single-member household predicted to consume a minimal amount of goods in addition to those households in larger homes (e.g., a house rather than a small condo or apartment). In some cases, a storage area size may be inferred based on the type of housing unit, such as home with 4 bathrooms as opposed to a condo with 1 bathroom, which the user may indicate during a registration process. Similarly, composition of the household, which the user may indicate during a registration process, may be utilized in connection with the inferred storage area size to determine a corresponding delivery schedule (e.g., bi-weekly or monthly). As noted above, an amount of consumption of different goods may be predicted for a monthly period, however, those amounts of consumption of different goods for a month may be based on a daily predicted amount of consumption of different goods. Thus, for example, monthly, bi-weekly and other delivery schedules may be determined based on the corresponding number of days between a current delivery and a next delivery (e.g., 14 for bi-weekly and in accordance with the number of days in a month for a monthly delivery). Accordingly, a variety of different delivery schedules are contemplated as consumption amounts may be determined to a daily rate to adjust amounts to a given length of time between scheduled deliveries (e.g., which may account for earlier or later deliveries on monthly schedules due to weekends, differing number of days in different months, and the like).

The predictor 130 may obtain a consumption model to determine the predicted amounts of different goods consumed over a period of time for the user (e.g., the household of the user based on properties of the household). In some embodiments, the consumption model may output predicted amounts of consumption for different goods as a daily rate by which longer durations of consumption may be inferred (e.g., daily rate×14 days for a bi-weekly delivery or daily rate×number of days until a next monthly delivery). The predictor 130 may construct or obtain a feature vector based on the information present in a user record, such as the properties provided by a user during a registration process as described above, based on feedback provided by the user, and other properties. In some embodiments, multiple feature vectors may be constructed or obtained, for example, to account for good preference properties or other factors, or a feature vector may be split into multiple feature vectors, such as for utilization by different models. As noted above, it is expected that in many instances a feature vector for a user (e.g., the household of a user) may not include every property (e.g., as a feature) which may be processed as input. For example, it is expected that user records for newly registered users will contain fewer properties (e.g., an initial set of properties) that those of users who have provided feedback and other data over the course of their subscription. In some embodiments, entries in a feature vector for which a value corresponding to a property is unknown or a user did not provide a value for the property, may be left, at least initially, as NULL. At least some NULL entries may be typical of feature vectors based on user records of newly registering users. In some embodiments, prompts for user feedback may target one or more properties for which a value is NULL, such as in a hierarchical priority, rather than ascertaining feedback for properties which are known.

In some embodiments, the predictor 130 processes a feature vector corresponding to a user record to determine estimated values for one or more NULL entries. In some embodiments, initial processing to determine estimated values for one or more NULL entries is performed to populate one or more corresponding feature vector values expected by a consumption model. In some embodiments, the estimated values may be determined based on corresponding values of other like users, such as based on the user records of those users. For example, the feature vector of the user record may be compared to feature vectors representative of different clusters of other existing user records to determine a closest matching cluster based on the entries present in the feature vector of the user record. In some embodiments, clustering may account for regional, location, and other effects which initial registration properties may not capture. For example, in some embodiments, a feature vector may include one or more bias values (e.g., as initially NULL values), which may be inferred based on a clustering process, such as where like users (e.g., the households of those users) are expected to consume a similar amount of a good but in practice do not. As a practical example, similar users (e.g., downtown condo) in different locations may commute to work very differently on average, e.g., generally by car (e.g., a user in Dallas) or generally by bike, foot, or public transportation (e.g., a user in Chicago, Washington D.C., or NYC), and those users which do not generally commute by car may utilize a good (e.g., paper towels) at a higher rate. More generally, users living a certain area may generally consume a good in higher amounts than users living in other areas. Bias may also exist due to other factors.

In some example embodiments, bias values account for relationships which model training cannot (or does not yet) accurately capture for at least some user records (e.g., clusters thereof). In some cases, bias values may account for attitudinal differences between households (e.g., prefers to have a larger stockpile of goods) than necessarily an inaccuracy of predicted consumption. In some embodiments, the user records corresponding to the clusters are user records of users meeting a set of criteria, such as having provided at least some feedback on at least some deliveries of goods and received a threshold number of deliveries. For example, a cluster of households may prefer a larger stockpile of goods and those households may initially report having too few of a good, but later revert to the predicted consumption value. A newly registered user for which a user record includes properties indicative of a similarity to a representative feature vector of that cluster may be inferred to exhibit similar traits, and a bias value may be utilized to increase the amounts of goods that household receives initially. In some embodiments, a time component, like a subscription duration, such as from newly registered (e.g., 0) to long time subscriber (e.g., 10, as a normalized max value based on number of deliveries or delivery accuracy), may be utilized during a clustering process to capture one or more trends like that described above. For example, subscription duration may be utilized to attenuate a bias value (e.g., to a mean or predicted consumption rate) based on bias trends within the cluster. In other words, clustering may leverage histories of user records which are more developed than a user record for which a matching cluster is being identified (e.g., based on an initial set of household properties).

In some embodiments, an accuracy component, like an estimated amount of good consumption to actual consumption may be utilized in addition to or instead of a subscription time component. For example, a subscription time component may be a proxy for accuracy or vise versa, which should not suggest that both values may not be used in some embodiments. An accuracy component may be determined based on actual consumption, as determined by user feedback in view of amounts delivered, compared to predicted consumption amounts (and may be expressed, e.g., as an approximation error, standard deviation, mean percentage error, etc.). In some embodiments, a feedback measure, like a subscription time component vs accuracy component value, or ratio, may be tracked for one or more users or clusters of users to determine when (and thus what) events, like particular feedback, and which model or bias value resulted in a corresponding prediction that more closely matched (or diverged from) the household consumption. For example, the feedback measure may indicate how quickly and by what degree a predicted consumption by a household returned to actual consumption (e.g., after receiving user feedback or other adjustment). To that end, embodiments may record feedback measures (e.g., for a user, household, or clusters) to determine which feedback questions are more apt to obtaining high value (e.g. more indicative of consumption habits) responses than others. If a given feedback question prompts user responses that generally yield more accurate predictive output for those users by the model in the future, those questions may be prioritized (e.g., for other users or asked more frequently). Conversely, if a given feedback question that prompts few user responses or prompts user responses that generally yield no better predictive output for those users by the model, those questions may be omitted (e.g., for other users). In some embodiments, different feedback questions may be prioritized (or omitted) for different clusters of user households. In some embodiments, tracking the feedback measure over time may indicate whether a household is diverging from past consumption habits, which may indicate a change in household composition, or that consumption habits have otherwise changed (e.g., going out to eat more rather than cooking at home, more guests over, etc.). Embodiments may detect the divergence based on consumption model outputs, amounts of delivered goods, and user feedback indicative of status of one or more goods, and may determine future prompts for feedback based on the detection.

In some embodiment, the predictor 130, in response to identifying a closest matching cluster to a feature vector of a user record, may populate one or more NULL entries of the user record based on values inferred from the closest matching cluster. In some embodiments, a set of closest matching clusters may be identified, and the predictor 130 may determine a NULL entry values as a weighted sum computed based on the distances of the clusters and the respective entry values of the representative feature vectors of those clusters. In some embodiments, the weighted sum is compared to a threshold for inferring a Boolean or whole value for a NULL entry. In some embodiments, a Boolean or whole value is selected based on a majority value for the entry based on the set of closest clusters or closest cluster irrespective of distance. Thus, for example, values for NULL entries in the feature vector of the user record may be inferred, although such processing need not be required for an initial consumption prediction. In either instance, as a user engages with the subscription service such as by receiving fulfilled deliveries and providing feedback on consumption of goods provided to the user within those deliveries, the user record may be updated as described below, and thus a feature vector corresponding to the user record may be updated and utilized to estimate an updated consumption of one or more goods to which the user subscribes. In some embodiments, the updated consumption may be determined prior to a next scheduled deliver by a consumption model (which may be iteratively updated based on updated user records that may be identified as training records).

As described above, a reduced set, or initial set, of factors determined to be indicative of consumption of goods and preferences of goods may be requested from the user during a registration process or determined based on other information obtained based on user provided information during the registration process. A user record 183 may be initially populated with those factors and the user record may be updated with additional household properties and goods preference properties over time such that a feature vector corresponding to the user record may be updated for iterative processing by the predictor 130, such as with a consumption model by the predictor 130. Additionally, a user record may be updated based on fulfilled deliveries containing goods to which the user subscribed to through the subscription service (and optionally information pertaining to obtaining those goods outside of the subscription service). For example, when an delivery containing one or more goods is fulfilled by the subscription service for a user, the user record of the user may be updated to reflect information about the amounts of each item included in the delivery and when the delivery was fulfilled, shipped, or received by the user. Additional information about the goods may also be stored to the user record of the user and include information such as a brand and an amount of a respective good. In some embodiments, amounts of the good may be tracked by a number of a stock keeping units ("SKUs") included (e.g., 1×1234 and 2×5678). Other amounts may be determined from the stock keeping units, such as a count of an individual good. For example, 1234 and 5678 can both be SKUs of paper towels, but with 1234 corresponding to a 12 roll unit and 5678 corresponding to a 2 roll unit, and thus a user record indicating a delivery including 1×1234 and 2×5678 can be determined to include delivery of 16 rolls of paper towels to the user. Other embodiments may store only a count of an individual good within the user record. In some embodiments, the count of an individual good corresponds to an amount which the predictor estimates user consumption in (e.g., user consumption may be measured on an individual good level, like 1 roll of paper towels, or the smallest SKU unit, such as 2 rolls of paper towels). Accordingly, the counts and amounts discussed herein may be expressed in different ways, like in relation to a reference SKU or an individual good (e.g., at a conceptual level).

The delivery information for goods may be stored in a vector, vectors, matrix, or other data structure like a linked list or tree relating the corresponding data to a good. In some embodiments, a format may be GoodA: <N,SKURecord_ID,date>, and the SKURecord_ID may correspond to a SKU record 185 stored within the repository 180. In some embodiments, GoodA may be an entry within another data structure, like another vector or linked list or matrix within which other data is also stored for a user record 183, such as a data structure including one or more entries that indicate to which items the user subscribes. The SKU record 185 may be obtained to determine information about the delivered good or may obtained to optionally populate information for GoodA. For example, a SKURecord_ID may be operable to obtain a SKU record including information for the good such as <count,F1,F2 . . . Fn,SKU> where count indicates the number of the good within the SKU (e.g., 12 for 12 rolls of paper towels), F1 . . . Fn may describe other factors pertaining to a good (e.g., number of sheets per roll, sq.ft., and the like), and SKU is the SKU (e.g., where SKURecord_ID may correspond to some other reference, like a location of the record rather than the SKU itself). Thus, an example vector representative of a good in a fulfilled delivery may be determined or obtained based on the SKU record and optionally stored to the user record, e.g., GoodA information may be determined to be GoodA: <N,count,F1, F2 . . . Fn,SKU,date> based on a SKURecord_ID. For example, a fulfilled delivery including TissuePaper: <2,6, 300,T12345,02052019> may indicate that "2" "6"-roll count packages of "300" sheet rolls of tissue paper having the SKU "T12345" were shipped (or delivered) on "02052019" (e.g., 5 Feb. 2019); FacialTissue: <2,100,T54321,02052019> may indicate "2," "100"-count boxes of facial tissues having the SKU "T54321" were shipped (or delivered) on "02052019" (e.g., 5 Feb. 2019); TrashBags: <1,250,30,B12345, 02052019> may indicate "1" "250"-count box of "30" gallon tall kitchen trash bags having the SKU "B12345" were shipped (or delivered) on "02052019" (e.g., 5 Feb. 2019); and PaperTowels <1,2,200,PT12345,02052019> may indicate "1" "2"-roll count package of "200" sheet rolls of paper towels having the SKU "PT12345" were shipped (or delivered) on "02052019" (e.g., 5 Feb. 2019). In some embodiments, some of the information may be maintained in the database by SKU or SKURecord_ID rather than included directly within the user profile. In some embodiments, a data structure may include entries for which the user subscribes to as SubscribedGoodsDelivery: <TissuePaper, FacialTissue, TrashBags, PaperTowels> where each entry may include one or more vectors or other data structures describing the delivery of the good on one or more respective dates. In some embodiments a quality indicator may be included in one or more vectors or determined based on a SKU record to indicate whether a good was (or is) premium, green, house, or budget. In some embodiments, one or more of the above factors may be included and the SKU itself omitted as availability of SKUs may change from order to order, and a SKU record may include a subset of SKUs sharing similar features (e.g., of a same brand and product line or type of brands or product lines) to afford selection of a closest matching SKU in the instance a brand/line indicated by a SKU (which may be maintained in the SKU record but marked as unavailable or out of stock, such as based on available inventory) is not available for a delivery.

Additionally, a user record 183 may be updated based on feedback provided by the user. The feedback may be utilized to populate household properties like those previous described or item preferences properties over the course of the duration which the user is subscribed to the service. The feedback may also include a value or values indicative of a status of a good, such as whether the user reported having the right amount (or enough), too few, too many, or being out of a good. In some cases, the values may be inferred from natural language responses provided by users, and a magnitude of the value may also be inferred. For example, if a user reports a status of "I do not have many rolls of toilet paper left" temporally proximate to a next delivery, a value may be indicative of the user having too few, such as a negative indicator (or "Low"), and the magnitude may correspond to an amount, like 6, and thus an amount of deficiency, like −6 rolls, may be determined. In many cases, the amount may not be provided directly, but inferred based on the natural language text of the feedback. For example, if the user reports "I need more" or "on the last roll" may be inferred as "out" to indicate the user requires an immediate delivery of the good (e.g., rather than including more of the good in a next delivery), and depending on the timing of the next delivery or other factors one or more other goods may be included in the immediate delivery (e.g., in amounts those other goods would have been provided). In some embodiments, the user may be prompted with an option to receive those other goods in the immediate delivery. Alternatively, for example, a report of "I do not have many rolls left" or "I am down to the last package" may be inferred as "low" to indicate the user is on a last SKU package amount, rather than entirely out, and the user should be provided a larger stockpile (e.g., by including an additional amount of the good in a next delivery for the next consumption period). In some embodiments, an amount remaining may be inferred based on a SKU package amount. For example, if the user reports being down to the last package of toilet paper, and SKU which was shipped to the user corresponds to a package amount of 3 rolls, the feedback may be determined to indicate that the user has between 1 and 3 rolls remaining. If a combination of SKUs are shipped for a same good, such as a SKU corresponding to a package of 3 rolls and a SKU corresponding to a package of 6 rolls, the SKU including the lesser amount may be selected for the determination, or the user may be prompted for additional feedback (e.g., to indicate whether the last package included 3 rolls or 6 rolls, or a specific amount of rolls).

In some embodiments, a follow-up notification may be issued based on the inferred amount and action, e.g., "6 additional rolls will be included in a next delivery scheduled for DATE, please indicate if you need them sooner" or "6 additional rolls will ship immediately and are scheduled to arrive DATE, please indicate if you would like them to be included in your next shipment instead." In turn, an immediate delivery may include the additional amount or a next delivery may include the predicated amount plus 6 additional rolls, such as to provide the user with a larger stockpile with a future delivery reverting to the predicated amount absent additional feedback indicative of the user not having enough of the item, or a gradual decrease (e.g., the magnitude, 6, may be decayed exponentially or linearly over one or more future deliveries until falling below some threshold, like 1, or a minimum SKU amount, or less than half a minimum SKU amount).

As the user provides feedback indicative of a status of one or more goods, the corresponding user record may be updated to reflect the good for which the feedback is reported, the reported status, any adjustment based on the feedback (e.g., an immediate shipment including X amount of the good, or an X amount of increase or decrease of the good in a next shipment, etc.), and a timestamp of feedback. Thus, for example, the user record of the user may be updated with an item feedback vector such as GoodA: <HI/LOW/NC/OUT,AdjustmentAmount,Action,date> to indicate the feedback and on which date the user provided feedback on the status of GoodA, where HI (e.g., as a positive modifier), LOW (e.g., as negative), NC (e.g., as zero or NULL), or OUT (e.g., as negative or zero) may indicate, respectively, the reported status, such as too many, too few, the right amount, or none at all, with the adjustment amount indicating a determined magnitude of the amount of adjustment, and action indicating whether the adjustment should be effected by a next scheduled shipment or immediately (which may include sending the adjustment amount of the good immediately or moving the next scheduled shipment up in time and including the adjustment amount of the good). For example, if a user reports being out of a good, the action may be to ship the adjustment amount immediately; if a user reports too many or too few of a good, the action may be to modify a next shipment amount by the adjustment amount; and if a user reports the right amount of a good, no change may be made. In some embodiment, if a user reports too few of a good, a determination may be made as to whether the user may run out and an immediate delivery should be made (which may include moving the next scheduled shipment up in time and including additional amount of the good in the shipment). Other values or attributes may be utilized to indicate a status of a good as reported in user feedback.

A user record may be updated to include other information, such as predictions for next term shipments and bulk shipments, which are discussed in greater detail relative to the scheduler 150. Such predictions may be based on predicted consumption in view of a duration of a next shipment from a previous shipment which included a good in bulk. As predicted consumption of the good may change based on user feedback and other updates to a user record, a predicted schedule may be updated and indicate a predicted date, and thus whether a given scheduled delivery should include the good. Such predictions may also be considered by the predictor 130 in a subsequent iteration of processing the user record. Moreover, user records, after at least some updates, may be filtered (e.g., by a ratio of feedback requested to feedback provided, number of fulfilled orders, and other measures of user engagement indicative of a high level of participation as a measure of user record accuracy) to determine a quality of the user record and identified to a training set for iterative training of a consumption model based on the determined measure of user record quality.

In some embodiments, the predictor module 130 processes a feature vector, such as a feature vector determined for a household corresponding to a user record 183, to determine consumption of different goods for the household. For example, the predictor module 130 may obtain a consumption model (e.g., a consumption model 181 from the repository 180) by which a feature vector for a household is processed. Other data structures may be used instead, or in addition to a feature vectors. In some embodiments, the feature vector is stored within the user record 183, and may be or include one or more vectors like those previously mentioned which encode properties of the household. The feature vector or other data structure may be provided as input for processing by a computer model, like a consumption model. In some embodiments, the feature vector or other data structure may be generated based on a user record 183, such as by parsing and extracting information from the user record based on a translation of the schema of the record to a schema of model input (e.g., to translate information stored according to a format of user records into a format expected by a consumption model). Translation, in some embodiments, may improve upon versioning issues which frequently arise when processing evolving records over a long period of time where computing models which process those records may also change.

In some embodiments, addressing versioning in user records accounts for different levels of granularity in different records, such as where a discrete value (e.g., 31) may be reported (e.g., for age) for some values in some records may be reported as a range (e.g., 30-39) in some other records. Additionally, in some embodiments, such translation may mitigate versioning issues of records in a clustering process to populate some values for some user records (e.g., upon initial registration). Here, in some cases, a discrete value, like a weighted average, for a value populated in a user record based on distances to respective clusters may be translated to a range for input to a model, or a range (or multiple discrete values) based on nearby clusters may be translated into a single discrete value for input to a model (e.g., based on a measure of central tendency or weighted distances), or vice versa, such that information in every user records need not be reformatted in instances where model inputs change over time (e.g., due to additional information in training records and the like), rather one or more values in a schema of a user record may be translated into values of a schema of a model. Additionally, as a user record is updated based on user feedback and other information various values may be updated that were previously populated with values or ranges of values based on clusters or a default values, and translation may be utilized to insulate models from the evolving nature of user records over time. Moreover, translation into a schema of the model inputs may enable compatibility with other informational sources and $3^{rd}$ party data where values of those sources may be also be processed (e.g., such as weather forecast information, past weather data, or housing unit information, or user schedules or sports seasons or schedules, which may update and change over time, and the like).

In some embodiments, the predictor module 130 processes an input data structure, such as a feature vector, comprising values for respective properties by a Neural Network (NN), of which there are various types. Examples include Recurrent Neural Networks (RNN) and feedforward neural networks (FFNN). Various embodiments of NNs may comprises connections between nodes forming a directed graph along a temporal sequence. Some NNs, like RNNs, may include one or more cycles (e.g., looping connection between one or more nodes), while other NNs, like FFNNs, do not include cycles and connections do not feedback to a previous node. Some embodiments may utilize a combination of different NNs, such as to predict cyclic and non-cyclic influences. As an example, consumption of goods may be viewed cyclically, as households in a given geographical area may generally consume more of a given good from November-December and June-August, and less from January-May and September-October in cycle that repeats on a yearly basis. Such cycles may hold true for some duration of time, such as where household properties are relatively static, but may not account for the changing nature of household properties. For example, the above cyclic behavior may result from a sizable portion of household members in different households in the areas attending college, rather than a seasonal consumption change exhibited by households. In some cases, it may be expected that at least some properties (e.g., seasonal differences and members going to college) may cancel each other out to some degree or compound at different points throughout a year—and this can lead to inaccuracies in predicted consumption for one or more goods for some households. In the above example, a household member returning home from college for holidays or the summer may result in consumption differences greater than other cyclical influences on average for other households.

Accordingly, such properties for different ones of the members of a household may be apt to capture within user records. Thus, for example, new properties for user records may be identified and queried for during a registration process or through a notification prompting relevant feedback from a user, and which may be processed to ascertain one or more values corresponding to the property. Thus, it is expected that some properties stored within a user record, e.g., data collected in records, may be identified and captured as trends are identified such that one or more models may be trained on records including values for those properties. However, even if a pertinent property is identified which would improve training of some models, users are often hesitant about offering up any and every detail of their household which may affects their consumption of goods. Thus, for example, users may be hesitant to or otherwise choose not to provide an indication of whether a member of the household is attending college or not (among other things). Further, household consumption of a good may not exhibit cyclic behavior in many instances as households frequently change in ways that are not cyclic. For example, whether a member of the household that is currently attending college returns home (or not) after graduation or otherwise moves out of the house may not be accurately predicted. These changes can be difficult to detect and thus difficult to prompt users to for feedback related to such changes unless the user provides such information on their own accord.

While the input feature vector comprises user record information, the output feature vector comprises a predicted consumption of different items. Those items may have deeper properties than consumption alone, such as whether the item is of a particular quality, like brand name, house brand, or environmentally friendly. Moreover, these deeper properties and predicted consumption may be reflective, and represented by looping connections between nodes. For example, a brand name item may require less amounts to achieve the same results as a budget item of the same type, but some users of brand name items are less apt to conserve (while others do conserve), and thus different loops may provide different consumption predictions based on the different entries of the input feature vector. Accordingly, the output feature vector may comprise a predicted consumption of different items and predicted properties for respective ones of those items, such as a quality of the item having the predicted consumption. Thus, for example, if the input data structure indicates a certain set of properties, one of which may be a preference for name-brand goods, the consumption model may predict consumption based on that property. More granular differences between different goods of a same type (e.g., between two different brand-version of paper towels) may be accounted for by adjusting the predicted consumption based on determined adjustments stored in association with SKU records. For example, paper towels that include soap (e.g., for washing dishes) may be used at a much higher rate than other paper towels by virtue of households that use paper towels including soap frequently utilizing that version of paper towel for more things than households using a regular version of paper towel.

In some embodiments, such a consumption model may include an attention mechanism in addition to one or more NNs. For example, one or more attention mechanisms may be incorporated into a consumption model including one or more NNs. An attention mechanism may be an attention model that processes inputs to a NN of the model, and which enables the NN to refer back to the input. Thus, for example, an attention model may be implemented to pre-process one or more inputs to a NN. For example, the attention model may include the NN, and like NNs, different attention models including different NNs (which may be of a same or different type) may be staged. For example, an attention model including an FFNN, or an FFNn, may be staged prior to an attention model including an RNN, or vice versa. In some embodiments, a FFNN or attention model processes an input feature vector, such as to account for longer term changes in household consumption, prior to processing with a RNN. In some cases, an FFNN may not pick up on some cyclic dependencies or other aspects (such the affect a vacation has on consumption) which a RNN may take into account more efficiently, but an FFNN may pick up on longer term dependencies, and such benefits may be afforded through an attention model including an RNN. Some embodiments may implement an attention model to process an input feature vectors to a RNN, which may then account for shorter term cyclic (e.g., less than a year, like within a month) and non-cyclic affects but also better account for longer term cyclic (e.g., like a season or a year or longer) and non-cyclic affects which occur over relatively longer periods of time. In some embodiments an attention model may also process a feature vector prior to input to a FFNN. Different attention models may be used to preprocess inputs for the different NNs. For example, a first addition model may preprocess an input feature vector for a FFNN and a second addition model may preprocess an input feature vector for a RNN. In some cases, the feature vector for input to an attention model (or a NN) is the output of another NN.

In some embodiments, an attention model is implemented to preprocess inputs to a NN to focus the NN on specific aspects of a complex input, such as feature vectors corresponding to properties which are analyzed to determine household consumption as discussed herein. For example, an attention model may segment a complex input, e.g., property by property, one at a time until the entire feature vector is categorized, and those smaller segments are then processed sequentially, and that sequential processing may refer back to input features (which may be indirect, such as by weights rather than the features themselves). In some embodiments, the attention model is trained, based on user records (e.g., by corresponding feature vectors), to map a feature vector (or segments thereof) and key-value pairs to an output. An output, which may correspond to an entry in an output vector, may be calculated as a weighted sum of the values corresponding to the keys which map to an input feature (or features), such as by a weight assigned to each value expressed by a compatibility function of the input with the corresponding key value. In turn, a NN network may take an input feature vector which may be based at least in part on outputs of the attention model (e.g., such that different inputs are related to each other by weighted outputs of the attention model). Embodiments of attention models may relate dependences identified within the NN back to the input sequence, e.g., like a memory, to account for contextual affects on consumption between properties that are not necessarily proximate to each other or related in the input. Memory, in this sense, corresponds to a weighted combination of memory locations, not a single value, which may enable end-to-end training approaches such as by using backpropagation. Thus, for example, implementing a NN within an attention model may account for long-range dependencies which otherwise may vanish when utilizing the NN by itself.

Models, like the above consumption model, which may incorporate one or more NNs or attention mechanisms including NNs, may be trained with various, model-appropriate, training algorithms, including Baum-Welch, gradient descent, backpropagation, and the like. In some embodiments, models are trained by a background offline task using one or more machine learning techniques (e.g., model-appropriate training algorithms). For example, models may be trained to generate the predicted consumption of different goods over a period of time for a user based on a user record. In some embodiments, some or all of the weights or biases of a neural network (or other models) described herein may be calculated by executing a machine learning algorithm on a training set of records indicating historical consumption of goods for a household having certain properties, such as indicated by seeded records or determined from user records (e.g., which may be selected to the training set). As users engage with the subscription service, such as by providing feedback on the amounts of goods received to the feedback model, seeded user records may be updated based on information about consumption of goods fulfilled by the subscription service and feedback provided by users of the subscription service about their consumption of the goods. In turn, as user records are updated, the model may be retrained based on an updated set of user records.

Some embodiments may execute a gradient descent optimization to reduce the error rate and select appropriate weighting and the bias values within the model. In some cases, a predictive model (e.g., a vector of weights) may be calculated as a batch process run periodically. Some embodiments may construct the model by, for example, assigning randomly selected weights or biases, calculating an error amount with which the model describes the consumption data and rates of change in that error as a function of the weights in the model in the vicinity of the current weight (e.g., a derivative, or local slope), and incrementing the weights in a downward (or error reducing) direction. In some cases, these steps may be iteratively repeated until a change in error between iterations is less than a threshold amount, indicating at least a local minimum, if not a global minimum. To mitigate the risk of local minima, some embodiments may repeat the gradient descent optimization with multiple initial random values to confirm that iterations converge on a likely global minimum error. Other embodiments may iteratively adjust other machine learning models to reduce the error function, e.g., with a greedy algorithm that optimizes for the current iteration.

The resulting, trained model, e.g., a vector of weights or biases, may be stored in memory and later retrieved for application to new calculations on newly updated user records, periodically to confirm scheduling of bulk items, or proximate to fulfilling an order for a user (e.g., to capture temporally proximate factors such as seasonal changes affecting consumption of different items, like changes in facial tissue consumption when allergens are high, during wintertime, flu rates, etc. that are present in a geographic area corresponding to the user, although such changes may be tracked by scheduling weights, such as by iterating the predication over a user record with different fulfilment dates or extending a prediction period such as to a year for which the yearly consumption prediction comprises component monthly consumption predictions for items). Specific factors like seasons affecting consumption of different items may be reflected in the model according to changing levels of consumption (e.g., as indicated by user feedback) within a geographic region like shipping zip code, state, etc. and need not be accounted for directly by imputing those external factors, but rather on the basis of past trends in consumption of items by users in those areas as indicated by user records and temporal feedback pertaining to users in those areas (e.g., multiple users in zip code 54000 indicating out of facial tissue). However, embodiments contemplate querying databases, like weather and allergen databases, to predict consumption of items based on historical trends and current forecasts for different areas. In some cases, cyclic loops in the network may be unrolled during training. In some embodiments, an attention model, or multiple different NNs, may focus on different properties. For example, a FFNN may predict a baseline consumption for a household based on information like when different values were populated in the user record, such as to account for longer-term changes in consumption, such as a result of a child growing older, and other factors. Longer-term changes may also include changes in consumption rates of different products after having a baby (e.g., as an illustrative example because diapers, baby wipes, toilet paper and other goods may be consumed in different amounts for the baby over time) where current age of the baby may be determined based on when a user first indicated information about the age of the baby (e.g., as provided by the user, such as infant, or in months), whether during a registration process, provided via user feedback, or otherwise prompted, such as in response to electing to subscribe to additional goods pertaining to infant or child care or if manually changing amounts of other goods to receive (e.g., electing to greatly increase a number of paper towels or other products to receive). Some embodiments may execute a Hidden Markov Model. In some cases, each hidden state may be mapped to a corresponding good for which consumption is predicted or property of a user record. In some embodiments, the model may be trained with the Baum-Welch algorithm, and the consumption of items may be inferred with the Viterbi algorithm. In some cases, a subset of the training set may be withheld in each of several iterations of training the model to cross validate the model. The model may be trained periodically, e.g., monthly, in advance of use of the model.

Thus, as described above, the predictor module 130 obtains a user record and consumption model and computes a predicted consumption of items over a period of time (e.g., a month) based on the user record and consumption model. In some embodiments, input features may be determined from the user record and one or more other sources, which may be $3^{rd}$ party sources. For example, input features may include forecast weather data, scheduling information (e.g., for the user), or other information indicative of factors which may alter household consumption over that period of time. In some embodiments, the input features are parsed from the user record and, optionally, other sources, and translated into an input data structure of the model, like a feature vector. In some embodiments, the output is a feature vector, which may be decomposed into key-value pairs, such as a good and properties of that good, like a consumption amount. Thus, for example, for a given good, good properties may include a predicted amount of the good the user will consume over a given term, such as month. In some cases, integer programming techniques may be utilized to restrict consumption amount to a whole number, such as by placing constrains on outputs and training the model based on those constraints. In other cases, a raw consumption amount may be output, which may reflect a baseline measurement amount that may be modified by SKU information and then rounded to determine a whole number. In some embodiments, a model may account for one or more of these aspects, such as by training on SKU record information provided as input to the model such that the model may output key-value pairs including properties in addition to consumption amount for a good, such as SKUs/brand/version/etc. In some cases, good properties may also include a good quality such as brand name, house brand, budget, environmentally friendly preference pertaining to that good, a combination of SKUs that meet the consumption amount, or other information pertaining to goods.

In some embodiments, the consumption amount for a good is a predicted raw amount for the month (e.g., for a new user having no prior fulfilled order information in their user record or otherwise). In other embodiments, the consumption amount for a good may be a predicted amount of the good that the household will need to meet consumption for the period (e.g., by adjusting predicted consumption based on prior fulfilled order information, such as by including information about fulfilled (actual or seeded) in the training records). In the former case, a predicted amount of a good that the household will need to meet consumption for the period may be determined in other ways. For example, the predicted amount of a good that a household will need may be determined based on the predicted raw consumption amount for the good output by the model and other information (e.g., other data output by the model, like a predicted current excess, or other determined data). Alternatively, a predicted raw amount of consumption for the month may be adjusted in other ways, such as by tracking differences between predicted consumption and amounts delivered sequentially for a trailing duration of past periods of time (e.g., for one or more past delivery periods), where the adjustment may be based on a sum of the differences (or a running total), a buffer or threshold for the good for the household (e.g., maintaining a certain amount in reserve), and user feedback signals in the user record that pertain to goods included in prior fulfilled order information.

In some embodiments, the raw amount for the month may be adjusted by back propagation through one or more prior deliveries in comparison to the raw amount to predict a deficiency or excess even in the absence of user feedback. For example, some embodiments merge a revised prediction with scheduled shipments from either the initial determination or adjustments to compute a predicated amount of consumption for a period (e.g., in raw amount or in an amount which should be provided to the household for the period). In some cases, user feedback may indicate a user is running out of a bulk scheduled good (or other good) and, in addition to a monthly predicted amount (which may increase but not above a threshold to ship the bulk scheduled good), a key-value pair may be added or a value of a pair adjusted for the good (e.g., by a threshold amount or by a bulk item is fulfilled in the term (and which will cause revised scheduling based on the shipment of the bulk item and increased predicted amount).

In some embodiments, the predictor module 130 filters the output key-value pairs relative to one or more prior fulfilled orders or prior consumption determines for one or more goods to identify noise, like a drastic increase or decrease in an amount of a good. In some embodiments, a noisy key-value pair for a good may be identified to the feedback module 160 for generating a notification to the user to determine a status of user consumption of the item (e.g., too little, too much, out, no change needed, etc.) if no recent feedback exists. In some instances, such as where the properties of the good indicate a bulk quality, the filter output for the good may be disregarded or filtered based on a sum of prior determinations of consumption for the good relative to the last amount provided to the household in a shipment.

The rounder module 140 may obtain as input predicted consumption amounts of goods (and their respective properties) for a household and retrieve one or more SKU records. For example, the rounder module 140 may retrieve one or more SKU records that satisfy goods identified within the output. As an example, a key corresponding to a good may be utilized to query the repository 180 to return SKU records for the good. A query may also include other information, such as properties for the good, and thus SKU records may be returned that also satisfy those properties. One or more properties may be obtained as values associated with the key in the output of the predictor 130, such as amounts. Other preferences for goods may be obtained from the outputs of the predictor 130, or from the user record. In some cases the predictor 130 may provide an output structured in a schema by which SKU records 185 within the repository 180 may be queried, such as by merging outputs of a model with user record information to output key-value pairs, adjusting values of key-value pairs, and the like, as described above. In some embodiments, a key, or a combination of keys, may be hashed to identify one or more SKU records which satisfy the request within a hash table, or a tree data structure may be queried by traversing the tree to identify SKU records which satisfy the request, or a linked list corresponding to the good may be queried by traversing the linked list to identify SKU records which satisfy the request.

The rounder model 140 obtains one or more SKU records 185 determined to satisfy at least some criteria (e.g., like properties of goods that satisfy household preferences, such as based on quality, brand, etc. and amounts, such as based on one or more thresholds) for respective goods for which a predicted consumption amount of the good is provided. Thus, for example, the rounder 140 may match SKUs indicated in SKU record for the good to a determined consumption amount for the good. In some embodiments, the rounder 140 obtains one or more SKUs (and optionally associated SKU data) from a SKU record rather than the record entirely. In either instance, the rounder module 140 matches a predicted consumption amount of a good and preferences for the good to one or more SKUs for that good which may be selected for a shipment to the household. For example, a predicted consumption amount of 12 for paper towels may be matched to multiple SKUs having different counts of the item, e.g., 1 roll, 2 rolls, 6 rolls, 12 rolls, and 18 rolls (e.g., up to a threshold amount, for example, 1.5 times the predicted amount, and thus a SKU for 24 rolls may not be selected). In some embodiments, such as instead of a threshold, at least one next higher count SKU is identified, if available, along with SKUs having a lesser count or equal count (which is not to suggest that all lesser count SKUs must be returned as a threshold or sliding window approach may be utilized, such as to return no more than some threshold of SKUs, like less than 10, such as 3, 4 or 5 SKUs, which may differ for different products). In example instances where a query to obtain SKUs is not bound by a particular brand (or version within the brand), a set of SKUs may be obtained for multiple brand or brand-version combination determined to satisfy provided criteria. For example, a first set of SKUs may be obtained for Brand A Super Paper towels and a second set of SKUs may be obtained for Brand B Extra Strong Paper towels. In some embodiments, the different sets of SKUs for different brand-version combinations may be presented as available (or alternative) brand/version options to a user for providing or modifying a selection.

As described above, the rounder 140 translates a determined consumption value for a good based on predictions into one or more deliverable product SKUs, which may be a combination of multiple SKUs having a summed count (e.g., total amount) of the good that SKUs satisfies the consumption value amount. For example, if the predictor 130 determines a household needs 9 rolls of toilet paper to meet consumption demand for the period, the rounder may identify SKUs for 2 packs of 6 rolls, 5 packs of 2 rolls, or 1 pack of 6 rolls plus 1 pack of 2 rolls and 1 pack of 1 roll. In some cases, the rounder 140 may optimize packaging within a threshold of overage in the amount provided in a shipment to the household, and the threshold of overage may be based on household properties like size and the like. For example, 2 packs of 6 rolls may result in an overage of 3 rolls provided the household consumes the predicted 9 rolls. That overage, as described previously, may be tracked (e.g., in a user record for the household) and thus be accounted for in a determination of consumption amount for a next period. For example, the predictor 130 may take into account the 3 roll overage (in addition to user feedback and other signals indicative of changes in consumption), and determine a consumption amount of 6 rolls for a next consumption period (e.g., if household baseline consumption is 9 rolls per period and adjusted based on the prior overage).

Additionally, as described above, the rounder 140 may obtain SKUs with criteria driven selections of SKUs for goods maintained in SKU records based on properties of goods output by the predictor 130 or otherwise obtained from user records, such as to meet a specific brand or version of a good sought by (or predicted for) the household. In instances where multiple different brands or versions satisfy criteria for SKU selection, the rounder 140 may select from within the same brand-version (which may be based on a prior brand-version provided to the household) and optionally from another brand, such as for small amounts (e.g., based on detecting when a SKU having a small count would satisfy consumption for a good), which may be indicated as an alternative brand or version for a user to test and provide feedback. Additionally, SKUs for other brand-version combinations may be obtained to present users with alternative selection options.

In some embodiments, the rounder 140 may output one or more different sets of SKUs which meet consumption demand for a good for the period. For example, a first set may include a first SKU or combination of SKUs for a given brand-version of a good and a second set may include a second SKU or combination of SKUs for the given brand-version. SKUs or sets of SKUs for other brand-versions of the good and for other goods may be included in a similar fashion. In some embodiments, these different sets of SKU combinations may be selected from by a greedy algorithm or other algorithm, for selection of a SKUs to include in a shipment (e.g., based on other constraints like available shipping box dimensions or volume in which the various different goods subscribed to by the household may be packaged).

The rounder 140 may output key-value pairs, such as a SKU and a number, like a whole number indicative of the amount of the SKU (e.g., SKU A, 2) to include in a shipment. In some embodiments, a count of the good for the SKU may also be indicated as a value for a SKU (e.g., such as in instances where a particular SKU needs to be swapped at time of order fulfillment). In some embodiments, a good identifier may be a key and the corresponding value may be a vector comprising one or more SKUs (e.g., a set of SKUs) having an associated number for each SKU, and a total count of the set (e.g., total amount of the good) may also be indicated. In some embodiments, a bulk indicator may be output, such as for goods for which no more than one should be typically fulfilled unless modified by the user. Further, the bulk indicator may be read in later processing for scheduling a future bulk shipment of that item. In some embodiments, the rounder populates a cart responsive to the key-value pairs to include the items and representations thereof based on the SKUs selected for fulfilling the predicted amount of the item. In turn, the SKUs for fulfilling the order can be scheduled in e-commerce and ERP systems for order processing and shipment.

In some embodiments, a scheduler module 150 receives the output key-value pairs from the rounder module 140, which includes one or more SKUs for fulfilment. In some cases, the output key-value pairs are indicative of a combination of SKUs for a good. In some cases, the output key-values pairs are indicative of one or more sets of SKU(s) for a good (e.g., different combinations for fulfillment and which may include different combinations for respective brands or brand-versions from which a user may select). The scheduler 150 may analyze the key-value pairs output by the rounder 140 in comparison to the key-values output by the predictor 130 to determine a predicted reorder cadence based on fulfilled amounts of goods and the predicted consumption of the respective goods by the consumption model. In some embodiments, the scheduler 150 may generate cart data, such as by selecting, for each good to which the household subscribes, a SKU or combination of SKUs indicated by the output of the rounder 140 as satisfying the determined consumption amount for the good. In some case, the scheduler 150 may compare the amount of the good to the predicted consumption value and determine whether to generate a notice pertaining to the good. For example, if a 12 roll count of paper towels is selected and a determined consumption amount is 9 rolls per period, the scheduler 150 may generate a notice indicative of the difference relative to a next predicted reorder (e.g., "predicted consumption is 9 rolls per period; 12 roll package shipping this order, 6 roll package shipping next order") to communicate the inclusion of the amount of the good (e.g., in instances where a user might view the shipped amount excessive relative to actual consumption). Bulk shipments may include a similar notice, which in some cases may be generated in response to identifying a difference like that above or based on a bulk indicator. In turn, for example, if a 120 count box of trash bags is selected and a determined consumption amount is 20 bags per period, the scheduler 150 may generate a notice indicative of the difference relative to a next predicted reorder (e.g., "predicted consumption is 20 bags per period; 120 bag box shipping this order, next box shipping in X many periods") to communicate the inclusion of a bulk package.

In some embodiments, the scheduler 150 may alter SKU selection for packaging purposes. For example, the scheduler 150 may determine to fulfill a smaller number of trash bags if a 120-count trash bag packaging pushes the projected shipment weight above a certain threshold. Here, the scheduler 150 may determine metrics about a shipment based on the SKUs to include, such as weight, volume, etc., and compare those determined metrics to one or more criteria by which shipments are fulfilled. For example, if a shipment (e.g., based on an initial SKU selection), exceeds a volume criteria, the scheduler 150 may iterate over the available combinations of SKUs deemed to meet the determined consumption of a good to select a different combination of SKUs including a smaller amount of a good, and the analysis may be performed in a greedy fashion guided by iteration through goods based on higher to lower volume (e.g., paper towels→toilet paper→and so on). In another example, if a shipment (e.g., based on an initial SKU selection), exceeds a weight criteria, the scheduler 150 may iterate over the available combinations of SKUs deemed to meet the determined consumption of a good to select a different combination including a smaller amount of a good, and the analysis may be performed in a greedy fashion guided by iteration through goods based on higher to lower weight (e.g., liquids→trash bags→etc.).

The above process may be utilized to determine one or more collections of goods that satisfy a variety of criteria. In some cases, a plurality of collections may be identified such as by optimizing for different ordered combinations of criteria, such as a first combination by weight then volume (then optionally cost, e.g., due to packaging differences, or other criteria), another combination by volume, then weight, then other criteria, and so on. Thus, for example, one or more collections may be candidate collections, from which an objective function may elect an optimal collection of goods for which the SKUs satisfy weight, volume, and volumetric efficiency in available shipping box sizes and optionally other factors. For example, in some embodiments, the scheduler 150 may sample and switch at least some of the other applicable SKU combinations identified by the rounder 140 to satisfy one or more objective functions to meet, for example, weight and dimensional packing metrics to determine an efficient combination of goods amounts that meet predicted consumption amounts for a current period in view of a forecasted amount for a next period (e.g., current period predicted amount plus next period predicted amount less current fulfilled amount where the fulfilled amount is equal to or greater than the current determined consumption amount for the period) that maximizes packed weight within a given threshold (e.g., 2 lbs, 5 lbs, etc.) and dimensional packing within a given threshold (e.g., 1 cuft, 2 cuft, 4 cuft, etc. for different configurations of the goods within different dimensions of boxes of the volume). In another example, the scheduler 150 may compute count costs per SKUs In some embodiments. the scheduler 150 also determines a next proposed order for the next period, such as based on an optimization determination, and adds the next proposed order to a schedule for the user. Bulk items, for example, like trash bags, detergents, or other bulk shipment items may also be scheduled to a future order period for fulfillment. Information about these next or future shipments may be provided to a user for review (e.g., during a registration process or if the user desires to modify an order via an interface of a website or application) or for generating notifications by which user may provide user feedback. For example, feedback may be solicited on a status of an amount of a good within a household prior to a next fulfillment period for the good, and the amount of time prior to the fulfillment period may be based on duration or amounts included in prior shipments. In some cases, the scheduler 150 generates a notification date for one or more goods based on when a household might need more if consumption exceeds a predicted amount by some threshold (e.g., 5-20%), and places one or more identifiers for goods (or SKUs) in a notification queue. For example, the scheduler 150 may submit one or more identifiers or SKUs and associated information into a queue with the feedback module 160 for user consumption feedback (e.g., trigger outbound queries (text) to user after 3 weeks asking the user whether they are happy/running low/overstocked on an item or items). In some embodiments such a queue of rule-based queue entries provided by the scheduler 150 is desirable such that the feedback module 160 may determine whether to process an entry (e.g., based on prior solicited feedback for the user and good) rather than continually process user records outside of deeper analytic routines or feedback goals for user records.

Embodiments of the scheduler 150 may output a final order for fulfillment (e.g., the final SKU list and user record shipment location) with a fulfilment date and any other associated information. In some cases, the scheduler 150, such as prior to submitting a final order for fulfillment, may provide (e.g., post) order information for review within a user interface, such as via a webpage or application, like during a registration process or within an order review interface within which a user may alter selections of goods. However, such user review need not be required. If an order is confirmed, or the user takes no action, such as by threshold date prior to fulfilment date determined by the scheduler 150, the final order may be posted for fulfillment. For example, SKU and shipment information for a final order may be transmitted to a fulfillment center 190, which may include an order module 195 that places the final order in a que for processing (e.g., packaging and shipping of the indicated SKUs) by the fulfillment date.

Additionally, the schedule module 150 may output an order schedule including the key-value pairs corresponding to information about the order and goods included in the order, a next period prediction which may include key-value pairs for predicted amounts for fulfilment by the next period shipment date (e.g., <amount, date>), and key-value pairs for combinations of goods based on forecasted packing outputs of the objective function (e.g., <N,count,SKU>). Thus, for example, a determination of consumption of goods by household of a user may take into account fulfilled amounts of goods, and a forecast packing output may be retrieved by the schedule module 150 for analysis during objective analysis at time of next period shipment. Some output order schedules may include a bulk prediction for next fulfilment of a bulk goods if a bulk goods was fulfilled (e.g., <bulk, amount, date>) or previously scheduled for the user. All or some of the above information may be stored within the user record of the user to update the record of the user, or within another data structure. Thus, for example, consumption models may be trained on a time series sequence of fulfilled items and user feedback for respective ones of a plurality of households having given household properties, and validation may determine differences in new predicted amounts compared to prior predicted amounts to true one or more models in accordance with user feedback along with initial consumption determinations via machine learning. Further, in some embodiments, after a sufficient period of time of user engagement with the subscription service, some versions of a model or different models may be determined to more accurately predict consumption of that user and a given version or iteration of a model may be indicated in the user record for utilization by the predictor module until a later validation indicates a different version or iteration of a model more accurately predicts consumption for the household corresponding to the user record.

The feedback module 160 may transmit notifications to users to collect feedback for updating respective user records as described above. The feedback module 160 may also receive unsolicited feedback, such as inbound exceptions, for which the user record may be updated and passed to the predictor 130 for immediate consumption analysis and fulfilment of an item or scheduling adjustment based on the consumption analysis. Examples and response may include exceptions like, I'm out: immediately ship a replenishment amount, adjust user's model; I'm cancelling: trigger human engagement; I need to return something: trigger human engagement; I need to adjust: query model to processes adjustments and optionally trigger human engagement; I'm on vacation, I'm having a party, etc. In some cases, such as for feedback exceptions like I'm having a party, the predictor model 130 may predict a single-event consumption of items, which may include additional items specific to the feedback, like paper plates, napkins, or other applicable items to a party based on a consumption model and the user record or other information about the event indicated by the user. Other events, such as vacations, additional guests, and the like may also be accounted for by the predictor 130, such as by determining an amount of additional or reduction in consumption over the time of the event. For example, the predictor 130 may determine a consumption amount based on the household changes induced by the event and determine a ratio of event to non-event consumption over a given period (e.g., relative in town for one week of a month consumption period, household increased by 1 adult and event consumption determined with total consumption being a weighted sum), or event consumption may be determined as a difference in consumption for the specific period and added to total amounts of goods. Accordingly, some embodiments may include training consumptions models with diverse event data, possibly from a variety of sources, to enrich their ability to address as many different types of product, service, and user consumption of goods. As with other fulfilments, feedback may be requested to updated the user profile of the user based on consumed quantities of the items during the event, number of patrons to the events, etc. to provide accurate consumption predictions for the user in the future as well as to train models to predict consumption of other users for similar event types.

In some embodiments, some users participate in an enhanced feedback program, which may include the positioning of RFID readers (e.g., active RFID readers configured to read relatively inexpensive RFID tags suitable for such systems) in locations where fulfilled items are stored or disposed. In turn, during fulfilment of an order, such as by receipt of the order by an order module 195 of a fulfilment center 190 storing items for fulfillment, a notice may be placed on the order indicating that the household is participating in enhanced feedback (e.g., as indicated by a user record). In turn, RFID tags may be placed on different ones of the goods, such as to be read by an RFID reader when removed from the storage area within the home of the user or disposed in a receptacle or removed from the home. The order module 195 may provide, back to the feedback module 160, indications of which goods correspond to which tags. In turn, the RFID reader may transmit the information about which RFID tags were read (e.g., when removed from the storage area or other detection area) to the feedback module 160 such that more granular consumption patterns may be analyzed to update the user record (which may be utilized in a training set). Alternative configurations are applicable, such as a box or display type configuration which may include an RFID reader to detect which goods are removed by their corresponding tags or a pressure sensor array (which may be variable responsive to depth such as via actuation of a spring corresponding to the pressure sensor extending or contracting) or a resistive sensor array, either of which may detect changes in a sensor reading in the array that is mapped to a good (e.g., a particular SKU) positioned at that point of the array. Another alternative configuration may include a scale which detects changes in weight of a fulfilled order, such as when a user removes a good (e.g., a SKU) from a box of the order or package of an amount of a good (and some amount of which may be returned to the box), and transmits those changes to the feedback module. In turn, the feedback module 160 may determine which good and an amount of the good removed (e.g., as a count for the good) based on the detected weight change relative to weights of other SKUs (and individual items within the SKU) and package of goods shipped.

In some embodiments, an optical tag (or RFID tag or other NFC tag) may be disposed on one or more goods which a user device may read to transmit identifying information to the feedback module 160. For example, an optical tag, like a QR code or barcode may be disposed on one or more goods, like on the packaging of a given SKU of the good, or even individual ones of the good within the SKU. An NFC tag may be employed in a similar way. Here, the user may scan a tag to obtain tag information by which the user may report that the user has opened or is using a given good. Thus, for example, the user may report when the user has opened a 6-roll package of toilet paper. Alternatively, one or more tags (e.g., one for each good) may be provided by which the user may provide feedback corresponding to a good. In some cases, different tags may be employed and indicate the feedback which the user is providing by visual inspection (e.g., Almost out of Good A, I have too many of Good A, or Out of Good A). In some cases, these granular feedback operations may be employed for at least some users, such as to determine variation between different products based on switches between product SKUs (e.g., A-B testing), such variation in the amount of the respective good the household consumes due to differences in the products themselves. For example, different brands or version of paper towels may have different absorption rates or be stronger or include soap and the like.

Similar feedback may be obtained in other ways. For example, switching a household from brand (or brand-version) A to brand (or brand-version) B (e.g., based on the household accepting an offer to try brand B), and later switching the household back to brand A, where over each period an amount of brand A sent vs brand B sent is monitored, such as via notifications transmitted to a user device as feedback prompts, to determine whether pertinent consumption metrics differ between products (or SKUs or collection of SKUs). In some cases, the feedback module 160 may solicit feedback after a threshold amount of time of the different product being provided to the household, such as after 2-3 weeks (e.g., for a month long period) to ascertain amount of good remaining form the SKUs provided. Such feedback may be solicited over time, but may be queued for feedback automatically (e.g., by the scheduler) for new product or other changes in order or upon first delivery.

In some embodiments, the feedback module 160 classifies qualitative use feedback on a spectrum of how users (and thus different households) feel about amounts of supply of certain goods. For example, the feedback module 160 may classify qualitative feedback to ascertain a size of buffer of goods (e.g., beyond actual consumption) which a household (or similar households) prefer to keep on hand. For example, household consumption of 12 rolls of paper towels per month may be accurately predicted, but that household may desire to maintain a back-up supply of at least 4 rolls. Another household, such as a small condo unit may prefer to maintain a small buffer, such as due to the lack of available storage space. The feedback module 160 may generate notifications to prompt users for feedback regarding remaining supply of certain products, which may be stored in the user record. For example, a prompt for "how comfortable are you with supply of Good X today?" may provide an indication of what buffer a household is comfortable with. If the user is halfway through a consumption period and indicates half of the amount of good remains but they feel like they are "low," the feedback may be processed to indicate an increase in the amount provided to the household, such as in the next period, or over a few periods, that is greater than the determined consumption amount to establish a larger buffer. After establishment of the buffer, the amount shipped may be reduced to the determined consumption amount (e.g., on average).

Embodiments of implementing a buffer may be determined in different ways, such as by period duration, e.g., send 33 days' worth of good X for a period having 30 days, or by percentage, e.g., send 1.2 times good X, to establish the buffer. Further, a determined buffer for different goods may be stored in association with a user record, such as determined property, and a clustering process for user records of newly registered users may be used to determine a probable buffer for their households (e.g., based on the buffers determined for similar households based on feedback). In some embodiments, a newly registered user may provide initial supply information and a target start date, and the feedback module 160 may request user feedback between the registration time and scheduled fulfillment to determine consumption or buffer properties. An indication that a household is out of a product may provide a zero state, which in the event such feedback is reported, consumption over time of that good and feedback measures may be scored as of a higher quality (e.g., such that feedback is targeted to other goods).

In some embodiments, natural language processing may be implemented on user provided feedback, and an assigned confidence level may be compared to a threshold to determine whether to automatically process or flag the feedback for review. Review may include review of NLP determined response in association with user provided feedback to train the NLP model to determine context of responses. In some cases, the NLP model is trained on records comprising feedback prompts and user responses (e.g., which may be stored in user records) and may include training techniques like those utilized for consumption models (e.g., an attention model including a NN). Rewards for user feedback, which may be indicated in connection with provided tags, may be applied for a user in response to receiving data from a user device indicative of a tag, such as when the user opens a package.

In some embodiments, a consumption model may be a hybridization of an initial model and a model adjusted for a household or a cluster of similar households. In some cases, the combinations of models may account for major life changes or events (e.g., as indicated by user feedback) and determine changes in consumption for the household based on those properties. Thus, for example, a model may evolve for one or more households as fulfilments, user feedback, and other data feeds back into initial models and an initial prediction may be refined to an adjusted prediction through training of a model for a household or similar households to determine more accurate consumption patterns by reducing noise from dissimilar households or households where different properties counterbalance consumption amounts. In some cases, a collection of similar households for which a model is generated may be subject to macro trends for which the feedback module 160 may pre-solicit feedback prior to a trend period and segment a cluster of similar households into trend groups based on feedback responses. In some embodiments, the feedback module 160 may determine other metrics pertaining to user feedback beyond the response (or lack of response) alone, such as how long users and different users take to respond to same and different feedback prompts. Duration could indicate user resistance to feedback prompts which may be scored lower or higher based on the duration, or that some users do not know the answer offhand and take more time to provide a more accurate response.

While certain example products are described above, the disclosure is not so limited. For example, embodiments are applicable to a variety of goods which households continually consume over time, like laundry pods, dryer sheets, dishwasher pods or soap, dish sponges, packing tape, printer cartridges, paper, and the like. Thus, the principles of the present disclosure may be expanded to cover other such products.

Figure 2:
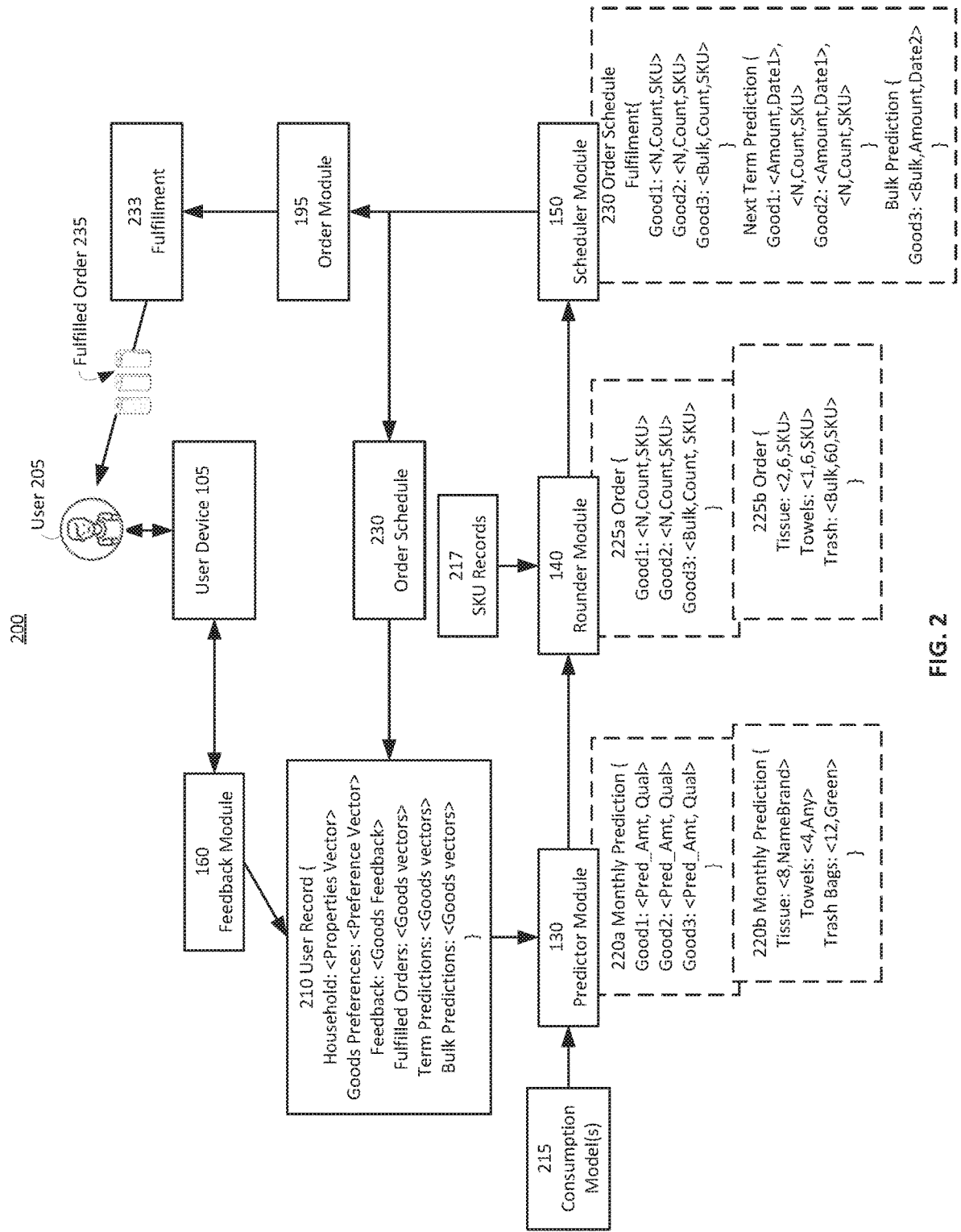
FIG. 2 illustrates an example computing workflow for adaptively determining user consumption of packaged goods with a consumption model to increase the accuracy of an amount of a good and a frequency with which that amount should be delivered to fulfill a subscription, in accordance with some embodiments.

FIG. 2 illustrates an example computing workflow 200 for adaptively determining user consumption of packaged goods with a consumption model to increase the accuracy of an amount of a good and a frequency with which that amount should be delivered to fulfill a subscription, in accordance with at least some embodiments. Example data structures are illustrative and example data may be structured in at least other example ways described herein.

In the example workflow 200, a process may generate or update a user record 210. For example, the user record 210 may be generated during a registration process and updated over the duration that the user remains subscribed to the service. The example user record 210, as shown, may include household properties and goods preference properties, for which at least some of the household properties and preference properties are populated for the respective vectors during a registration process. Household properties and goods preferences may be updated over time based on the user feedback provided to the feedback module 160. Other properties updated over time for the user record 210 by the feedback module 160 may include user feedback on goods. Additionally, as orders are fulfilled for the household of the user, a goods vector corresponding to the goods provided to the household may be stored within the user record 210. In some embodiments, a term prediction (e.g., a predicted next shipment or one or more predicted shipments in sequence) may be stored within the user record and update upon submission of orders for fulfillment. Predicted next shipments may be optimized based on the last fulfilled order and last determined consumption prediction. While the goods indicated (e.g., by the goods vector which may indicate a one or more SKUs for respective goods) for a term prediction may change based on user feedback (or SKU availability) as required to meet consumption and reoptimized, they provide a memory of the previous optimal delivery schedule for goods that met the last determined consumption amounts for the respective goods. In some embodiments, a bulk predication may also be stored within the user record, which may function similar to the term prediction, other than that the bulk prediction may provide a longer forward projection of when a bulk item should be included in an order for fulfillment (e.g., which a next term or next few term predictions may not capture).

The feedback module 160 may access the user record 210 and the above information stored therein to determine prompts for user feedback, which may be provided to a user device 105 of a user to solicit feedback from the user 205. In some embodiments, the user device 105 may interface with the feedback module 160 to participate in a registration process by which the user record 210 is established.

The predictor 130 may obtain the user record 210 to determine consumption of one or more goods to which the user elected to subscribe, such as indicated by included goods preference properties in the user record. In some embodiments, the predictor 130 may determine one or more clusters of other user records to which the user record 210 most closely matches (e.g., like a closest cluster based on a distance) based on at least the household properties and good preference properties (e.g., by which distances, which may be weighted distances based on properties, may be determined). In some embodiments, one or more matching (e.g., closest) clusters may be analyzed to obtain one or more household property values and optionally one or more goods preference property values not provided by the user during the registration process. A value may be weighted based on the values and distances to respective ones of the closest clusters. In some embodiments, predicted buffer values are obtained, which are indicative of reserve amounts of respective goods the household of the user likely desires to maintain (e.g., at a minimum). In some embodiments, the user record 210 may be updated based on information determined during the clustering process (e.g., until those values are updated based on user feedback and order information).

The predictor 130 may determine a feature vector based on the user record 210 (and optionally values obtained via clustering as outlined above) for processing, such as by a consumption model 215 or multiple consumption models 215. Model output may comprise a determined consumption output 220a describing consumption over a given period of time, like a day, week, month, etc. A daily consumption rate may be translated into monthly consumption and vise versa, and as such, the monthly prediction is illustrative and a model may take into account the number of weekdays and weekends in the given month. The consumption output 220*a* structure may include information about good (e.g., predicted amount, quality properties, and the like). An example is provided in example output 220*b*, which indicates predicted amounts and properties for bathroom tissue, paper towels, and trash bags. Here, an example quality indicator of user preference like NameBrand, Any (e.g., cheapest/budget), and Green (e.g., environmentally friendly option— whether by packaging, material, or both) is included, but properties are not so limited.

The rounder module 140 may receive the prediction output, e.g., 220*b*, and determine an order 225 with one or more SKUs for each good. For example, the rounder 140 may obtain SKUs from SKU records 217 based on the criteria for respective goods indicated by a prediction output 220. Example format 225*a* of the data structure is shown and includes respective goods along with a number of a given SKU to include for a good, a count for the SKU, and the SKU. For bulk items, a bulk indicator may be provided to indicate the SKU corresponds to a bulk package and generally no more than 1 of the SKU is provided. Example order 225*b* may correspond to a prediction for amounts of goods like those shown in monthly prediction 220*b*. In some embodiments, multiple possible SKU combinations that satisfy prediction criteria for a good may be output, and represent candidate SKU combinations from which the scheduler may select from to determine an order for fulfillment. The rounder module 140 may output the good information (e.g., SKUs or combinations of SKUs for satisfying an amount of a good) to the scheduler 150 as candidates.

The scheduler 150 may determine an order schedule 230, which may include a fulfillment portion, next term prediction portion, and a bulk prediction portion. In some embodiments, the user 205 may confirm or adjust which goods and amounts thereof which are fulfilled, and the scheduler 150 may revise the order schedule 230 based on the selections or adjustments, such as by selecting from SKUs provided by the rounder 140. If no SKU combination satisfies the user modification for a good, the user may be prompted for feedback regarding the change, and modifications may be returned to the rounder 140 to obtain additional and/or different SKUs. The portions of the order schedule 230 may be optimized, such as by an objective function, such as across the current fulfillment portion and at least a next term prediction portion. The fulfilment portion of the order schedule 230 may be passed to an order module 195 of a fulfillment center for fulfillment 233 to ship the fulfilled order 235 to the user and charge the user based at least in part on the shipped SKUs (e.g., along with shipping costs). The order schedule 230 may be output for updating the user record 210 and processing by the feedback module 160 to solicit feedback regarding the goods included in the fulfilled order and processed in subsequent consumption determinations by the predictor module 130.

The user 205 and other household members consume the goods in the fulfilled order 235 and may interact with the feedback module 160 via the user device 105 to provide feedback on consumption. For example, the user may scan a tag with the user device 105 which transmits tag information to the feedback module 160. The feedback module 160 may prompt the user to provide a status of a good to which the user may respond in natural language text or select a given open included in the prompt. The user may also utilize the user device 105 to transmit unsolicited feedback, such as "I'm out of good X" in the absence of a specific prompt. The user device 105, in some cases, may access at least some information based on the user record, such as information about a next shipment via an interface, which may include options by which the user may modify amounts or brands or versions of good included in the next shipment. In some embodiments, the feedback module 160 may detect user initiated changes to a next shipment and generate a prompt to solicit a reason for the change, for which the user may select a provided option as a feedback response or provide a different response in natural language text. The feedback module 160 may process the received feedback and update one or more of goods preference properties, household properties, and record the feedback provided by the user in the user record for the household. In some embodiments, the feedback module 160 may request the predictor 130 to process the user record 210 based on the changes to solicit feedback from the user, or additional feedback from the user, such as if the indicated change to a next shipment exceeds a threshold corresponding to a determined consumption based on updates to the user record. An updated user record 210 may be utilized during a next iteration of determining consumption for the household of the user, in a training set to update a consumption model, or otherwise as described herein.

FIGS. 3A, 3B, 3C, 3D, 3E, 3F, and 3G illustrate examples of user interface workflow for registering a new user with a subscription service, in accordance with some embodiments. For example, a subscription server 120 or other entity may generate one or more user interfaces like those illustrated below for presentation to a user.

In some embodiments, the subscription server 120 may generate one or more user interfaces for presentation to a user via a website, which may be accessed via a web browser (e.g., like a native application 115 including browser functionality, or which may be a web browser application). In other embodiments, a native application 115 may be configured to generate and present one or more interfaces and transmit collected information to the subscription server 120, such as via an API, like the API for receiving user feedback or other API (e.g., of the subscription server 120) providing similar functionality.

Information obtained through the registration of a new user may correspond to an initial set of properties corresponding to the household of the user. For example, a user record 183 may be generated for the user and initially populated with at least some household properties and goods preference properties based on information indicated by the user and collected by user interfaces like those illustrated in FIGS. 3A-3G. In turn, the user record 183 may be processed based on a consumption model 181, such as by a predictor 130 of a subscription server 120, to determine an initial shipment of goods for the user. Embodiments of a interfaces provided by the subscription server 120, native application or other entity associated with the subscription server may include, or be updated to include, additional or other interfaces such as one or more interfaces for obtaining billing information, shipping information, and the like as described herein. Further, similar interfaces may be presented in some embodiments to collect user feedback.

Figure 3B:
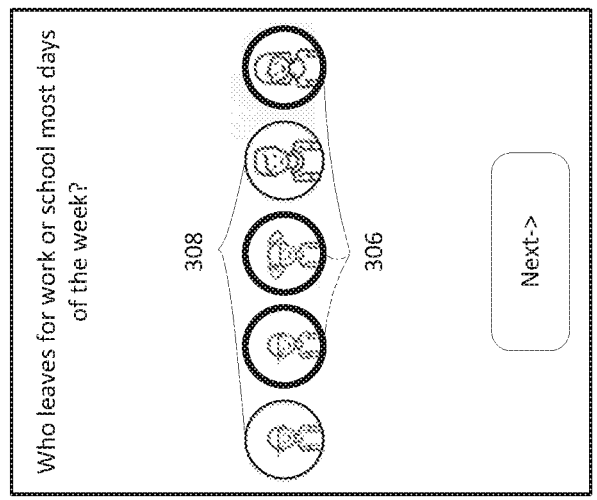
FIGS. 3A, 3B, 3C, 3D, 3E, 3F, and 3G illustrate examples of user interface workflow for registering a new user with a subscription service, in accordance with some embodiments.
Figure 3A:
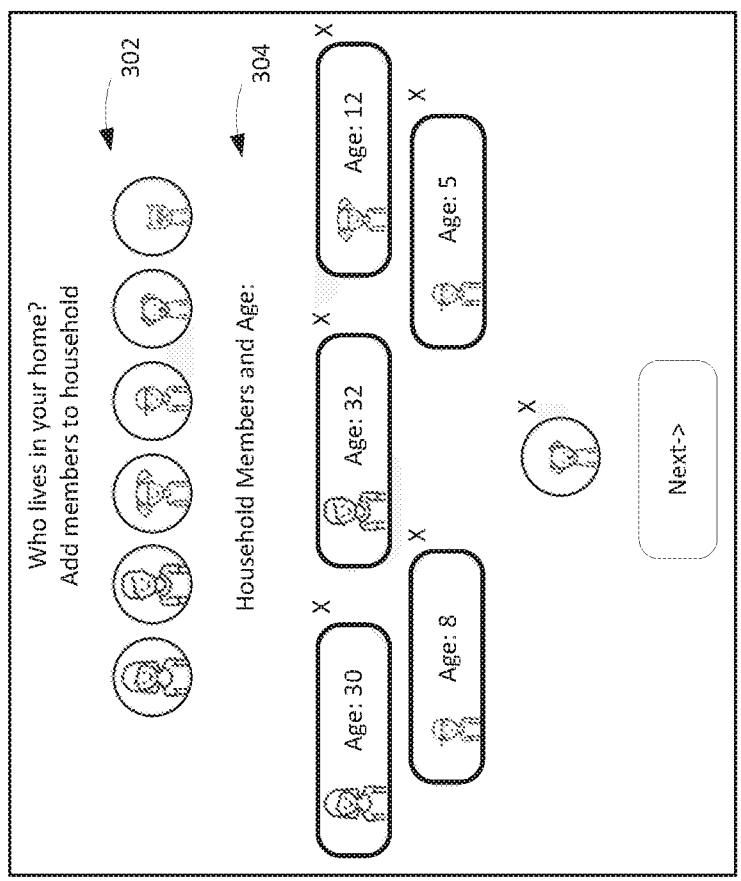

FIG. 3A illustrates an example of user interface by which a user may indicate membership of a household. As shown in the example interface, a user may select 302 from possible members to populate a household makeup. The example interface illustrates that a user has indicated 304 that their household includes two adults, three children, and a pet. For example, a user may select from possible options 302 to add a member to the household membership 304, or drag and drop a member, or via other selection. Household membership options may include further granularity, such as by a degree of granularity determined to more accurately predict consumption. For example, as shown, a user may optionally indicate an age of each member of their household, optionally indicate a gender of each member, and a kind of pet (e.g., cat, dog, etc.). In other embodiments, an age range (e.g., infant, toddler, 3-6, 7-12, 13-19, 20-30, 31-40, etc.) may be selected rather than input of a specific age. In other embodiments, a size of pet (e.g., for dogs) or age of pet (e.g., for cats, dogs, or other pets) may be selected. Embodiments contemplate determining which ones of the household properties and associated granularity are higher quality measures for estimating household consumption of goods. For example, households with an infant (e.g., between 0-1 yrs old) may be determined to consume a good, like paper towels, in greater amounts than households with a child but not an infant, or households with a child in potty-training years (e.g., between 3-6 yrs old) may be determined to consume a good, like toilet paper or laundry detergent, in greater amounts than households with a child in another age range, and the like. In these examples, higher granularity may provide additional information that is indicative of household consumption of one or more goods. In another example, a household with an older child (e.g., between 7-12 years old) may be determined to consume a good at no greater rate than if the child were 13-19 years old, or an adult, and thus it may be determined that additionally granularity in some areas does not provide additional information indicative of household consumption relative to less granular information.

In some embodiments, some users are provided with more granular options than others, or more granular information is determined by way of user feedback over the course of a subscription, and differences in determined consumption between otherwise similar households (e.g., two adults vs two adults and an infant or two adults and a toddler vs two adults and an infant or older child) are analyzed to infer consumption of different household members. In some cases, these consumption differences may be obtained via weights associated with characteristics of different members determined through training of a computer model or changes in outputs associated with different combinations of characteristics associated with different household members. In other words, the impact of different household properties on household consumption may analyzed to determine which properties to present during registration. In some cases, the impact of one or more properties may depend on other properties, and the analysis process may determine impact of combinations of properties (e.g., having values) in addition to, or instead of individual properties, and those properties (or values or ranges of values thereof) corresponding to an impactful combination (which may be suboptimal for other values or ranges of values of properties inputs) may be presented during registration. Accordingly, in some embodiment, a user interface may be updated based on determinations like that above to include a selection of members 302 that includes an infant and toddler option and omits an option to input an age of some household members (e.g., older children) or provides an option within the selected household members 304 by which a user may indicate whether a given child is an infant or toddler and other age options may be omitted.

FIG. 3B illustrates an example of user interface by which a user may indicate which members of a household spend more time at home than others. As outlined above, some household members may be associated with different levels of consumption of some goods, and additionally, the amount of time any household member spends at time corresponds to consumption of goods within the household rather than goods outside of the household (e.g., at work or at school). Thus, for example, it may be desirable to determine how often the different household members are consuming goods of the household rather than those from some other source. As an example, if a household member is estimated to consume 10 paper towels on average per day overall, but half of those are consumed at work or school rather than at home, that member's consumption would be approximately halved on workdays or schooldays (e.g., weekdays) and approximately full value on those days the member spends in the household (e.g., weekends, holidays, days-off, etc.). Disparities in consumption may apply with respect to consumption rates of some other goods (e.g., toiler paper, trash bags, etc.) but less significantly to others (e.g., laundry detergent). As shown in the example interface, a user may select 306 from possible household members (e.g., those populated for the household 304) to indicate which members leave for work or school most days of the week. In turn, other ones of the household members (e.g., those not selected) may be determined 308 as staying home most days of the week. Selection and determination may be performed in other ways, such as by selection 308 of which household members stay home, or in other ways (e.g., drag and drop and the like).

Like in prior examples, different household members may have differing impacts on household consumption with respect to whether they leave for work or school most days or stay home most days. For example, an infant or toddler staying home most days may have minimal impact on consumption of toiler paper relative to an adult but may have a significant impact on consumption of paper towels. In some cases, consumption differences based on whether a household member stays home most days or leaves the home most days may be obtained via weights associated with characteristics of different members determined through training of a computer model or changes in outputs associated with different combinations of characteristics associated with different household members. In other words, the impact of different household properties on household consumption may analyzed to determine which properties to present during registration. In some cases, the impact of one or more properties may depend on other properties, and the analysis process may determine impact of combinations of properties (e.g., having values) in addition to, or instead of individual properties, and those properties (or values or ranges of values thereof) corresponding to an impactful combination (which may be suboptimal for other values or ranges of values of properties inputs) may be presented during registration. Accordingly, in some embodiment, a user interface may be updated based on determinations like that above, which may account for afterschool activities for children, whether members generally spend weekends around the house, and the like by including additional granularity in terms of how often different members spend time at the house.

Figure 3G:
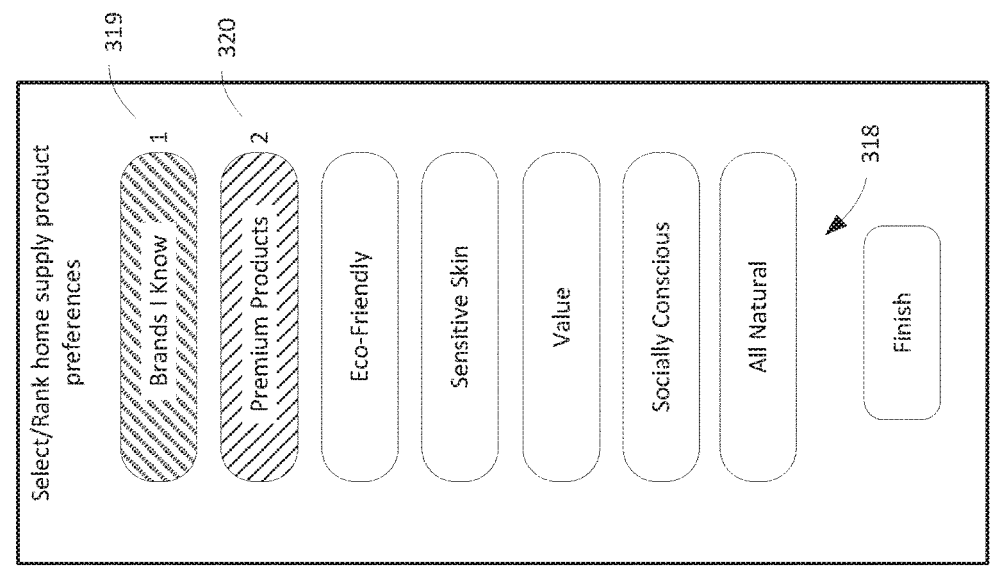
Figure 3D:
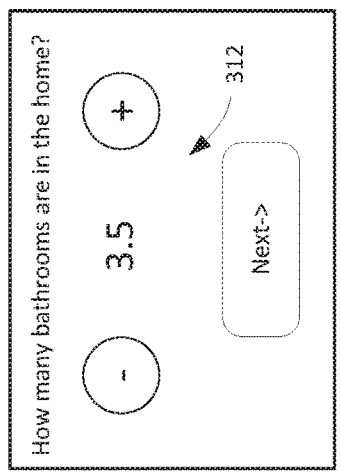
Figure 3F:
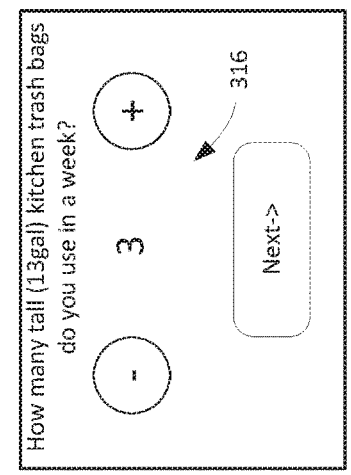
Figure 3C:
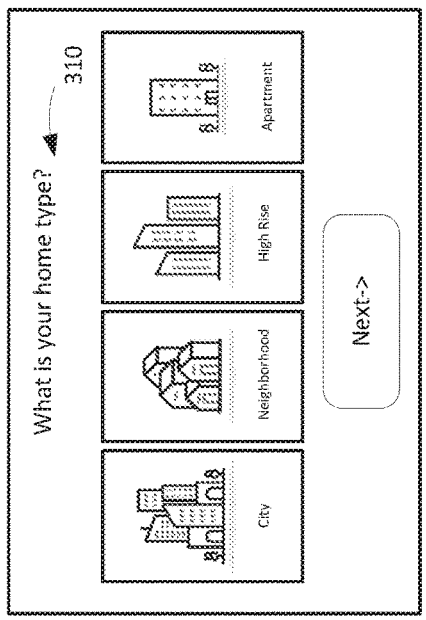

FIG. 3C illustrates an example of user interface by which a user may indicate a household type. Some types of households may be associated with different levels of consumption of some goods. For example, households in suburban neighborhoods may consume more paper towels than other types of households. Or, it may be the case that city and high-rise households consume more paper towels than other types of households. Similar disparities in consumption may apply with respect to consumption rates of some other goods (e.g., toilet paper, trash bags, etc.) but less significantly to others (e.g., laundry detergent). As shown in the example interface, a user may select 310 from possible household types. Information about the household type may be utilized in connection with other information obtained about the household. For example, FIG. 3D illustrates an example of user interface by which a user may indicate one or more properties of a household. For example, a selection 312 of a number of bathrooms in a housing unit type may provide information indicative of a relative size of the household. Larger households, or households with more bathrooms, may be provided with a different baseline amount of goods than smaller households even where consumption rate may be the same. For example, if a house includes 3.5 bathrooms (e.g., 4 bathrooms with toilet paper), 4 rolls of toilet paper are likely in use across the bathrooms, rather than every roll being used in a single restroom. Accordingly, even if total consumption is the same between those two households (e.g., by two adults), 3 of the 4 bathrooms in a house A would run out of toilet paper before a single bathroom in a house B if an initial amount was provided based on consumption alone. Moreover, house A with 4 bathrooms vs the 1 bathroom of house B may have a greater consumption of some goods, like power towels, or laundry detergent, such as due to a larger area to clean or utilization of additional bedding or other fabrics that are washed. In some embodiments, characteristics (e.g., 310, 312) for a house like those described above, among others (e.g., like square footage, number of bedrooms, housing unit type, lot size, etc.), may be obtained from a $3^{rd}$ party rather than prompted from the user via an interface, such as via an API which may be queried with a shipping address provided by a user to obtain information such as a home type, number of bathrooms, and other factors pertinent to consumption rates of some goods or baseline provision of some goods (e.g., to ensure each bathroom is provided with enough toilet paper in an initial shipment rather than an amount based on consumption rate alone).

Like in prior examples, different households having associated characteristics (e.g., properties) may have differing impacts on household consumption with respect to use of goods for cleaning and other chores, as well as other factors like a household having a backyard in a neighborhood and including a pet may be indicative of higher utilization of paper towels than if the housing unit did not have a backyard. In some cases, consumption differences based on household type and other characteristics (e.g., number of bathrooms, bedrooms, unit square footage, or lot (if any) square footage) may be obtained via weights associated with characteristics of different housing units determined through training of a computer model or changes in outputs associated with different combinations of characteristics associated with different households. In other words, the impact of different household properties on household consumption may analyzed to determine which properties to present during registration (or, which as noted above, may alternatively be obtained via a $3^{rd}$ party source). In some cases, the impact of one or more properties may depend on other properties, and the analysis process may determine impact of combinations of properties (e.g., having values) in addition to, or instead of individual properties, and those properties (or values or ranges of values thereof) corresponding to an impactful combination (which may be suboptimal for other values or ranges of values of properties inputs) may be presented during registration. Accordingly, in some embodiment, a user interface may be updated based on determinations like that above, or based on which properties of a housing unit can and cannot be obtained from a $3^{rd}$ party source, and the like, to obtain additional granularity for a housing unit.

Figure 3E:
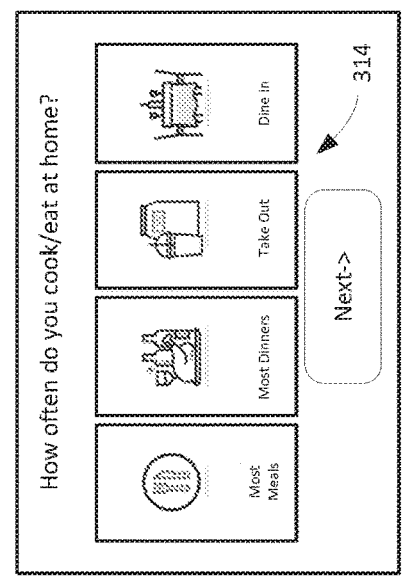

FIG. 3E illustrates an example of user interface by which a user may indicate how often members of the household cook or eat at home. Households may be associated with different levels of consumption of some goods based on their eating habits. For example, households that generally cook most meals at home may consume more paper towels than households that often get takeout or dine in at restaurants. Similar disparities in consumption may apply with respect to consumption rates of some other goods (e.g., dishwasher detergent, trash bags, etc.) but less significantly to others (e.g., toilet paper). As shown in the example interface, a user may select 314 from possible frequencies with which the household cooks or eats at home. This information may be utilized in connection with other information obtained about the household, such as if members of the household generally work from home but generally dine in at restaurants rather than eat most meals at home. FIGS. 3F and 3G illustrate examples of user interface by which a user may indicate additional factors relating to household consumption of goods. For example, an amount of trash bags utilized per week by a household may be indicative of consumption rate for different goods. Accordingly, a user interface as illustrated by FIG. 3F may prompt selection 316 of an estimate corresponding to use of trash bags per week. In another example, branding preferences may be indicative of may be indicative of consumption rate for different goods. Additionally, these preferences may be utilized to determine which bands, packaging, and other aspects pertaining to goods a household prefers. Accordingly, a user interface as illustrated by FIG. 3G may prompt selection 318 of a ranking corresponding to preferences in goods to receive in shipments. Ordered selection e.g., 319 followed by 320, which may be indicated in association with the selection in an interface, may provide a ranked preference corresponding to aspects associated with different goods. Selections may be ranked in other ways, such as by high or low importance, or the like. For example, selection of sensitive skin and all natural may correspond to detergents or other products which are unscented and lack one or more other chemicals.

Household properties like those described above may be indicative of different consumption rates across different households. Estimating consumption rates of different goods for a given household is complex, and space of different possible properties that affect consumption rates is large. Even if all properties within the space were known, collecting all such information is impractical. To mitigate user fatigue during a registration process, a limited set of properties, like an initial set for populating a user record, may be selected to mitigate user fatigue. Accordingly, aspects of the disclosure discussed above relate to determining which properties, or combinations thereof, are indicative of differences in consumption rates between households for different goods. In some embodiments, an initial set of properties is determined based on an analysis of user records for which consumption rates of one or more goods are well defined, e.g., they are determined to have a quality measure above a threshold, such as based on explicit and implicit feedback for the household associated with user records.

Differences (e.g. in values of properties) between households associated with respective ones of the user records, or clusters of user records, may be identified and examined to determine corresponding differences in consumption rates that correspond to a property (or certain values thereof), or combinations of properties (or certain combinations of values thereof). A property for which at least one value corresponds to a large difference (e.g., relative to at least one other value of the property) in consumption rate of a good (or several goods) may be determined based on one or more comparisons, such as between households, or clusters of households. Similarly, combinations (e.g., two or more) of properties for which at least one combination of values of those properties corresponds to a large difference (e.g., relative other combinations of values of those properties) in consumption rate of a good (or several goods) may be determined based on one or more comparisons, such as between households, or clusters of households. In either instance, consumption rate differences between different permutations, e.g., between pairings of different possible values or between pairings of different possible combinations, may be identified or determined in a similar manner. In some embodiments, a weighted sum of the differences (e.g., based on the number of different permutations) may be determined for a property or a combination of properties. The weighted sum may be compared to a threshold, like an average (e.g., of other properties or other combinations), or other baseline values to determine an impact (e.g., such as a score) of the respective property or combination of properties on predicted consumption rate (e.g., based on possible values for the property). Properties or combinations of properties may be ranked based on their associated scores or weighted sums indicative of their impact on predicted consumption.

An initial set of properties may be selected based on one or more rankings, such as by selecting a property to the initial set based on its rank among other properties, by selecting two or more properties to the initial set based on rank of their combination among other combinations, or by selecting a property to the initial set based on a weighted combination of its rank among other properties and ranks of combinations including the property and one or more other properties (which, in some embodiments, may be limited to those properties already selected to the initial set or other candidates for selection to the initial set). It is expected that not all combinations of values for properties selected to the initial set are optimal. For example, high rise (housing type) and having pet dog (pet type) may not correspond to a substantial difference in consumption rate of paper towels over not having a dog (or other pet) in a high rise. However, neighborhood (housing type) and having a pet dog (pet type) may correspond to a substantial difference, but there may also be no difference for other types of pets, like a cat. It may even be the case that cats do not significantly alter consumption rate of a given good while dogs do. Thus, in some cases, a value of a property need not be indicative of differences in consumption rate of a good, but rather may indicate that there is no significant difference for the property (e.g., compared to some other possible value).

In some embodiments, each property of the initial set is selected based a rank relative or other properties or a rank associated with a combination (e.g., by virtue of having a possible value included in the combination). For example, high rise and mostly eating out may correspond to a substantial difference in consumption rate of paper towels over other eating habits for users indicating a high-rise household type. Thus, as outlined above, different properties and combinations of thereof for a household and household membership, like those described in reference to FIGS. 3A-3G may have differing impacts on household consumption of some goods. In many cases, properties may be interrelated as discussed in some of the above examples, or relatively independent. Weights associated with different properties and combinations of properties may be determined through training of a computer model or changes in outputs associated with different combinations of characteristics associated with different households. For example, some embodiments may train a neural network (or other model) to estimate consumption, and at least an initial set of properties may be obtained, such as by the registration process, and the initial set of properties may be selected by based on properties and combinations thereof (e.g., by their associated values) that cause changes in outputs (e.g., estimated consumption of different products). Determining which properties, property values, combinations of properties, and combinations of property values cause changes in outputs may be examined based on changes to inputs, by examining weights associated with the different properties or values, or both. In other words, the impact of different household properties on household consumption may analyzed to determine which properties to present during registration (or, which as noted above, may alternatively be obtained via a $3^{rd}$ party source). Additionally, as noted above, in some cases, the impact of one or more properties may depend on other properties, and the analysis process may determine impact of combinations of properties (e.g., having values) in addition to, or instead of individual properties, and those properties (or values or ranges of values thereof) corresponding to an impactful combination (which may be suboptimal for other values or ranges of values of properties inputs) may be presented during registration. Accordingly, in some embodiment, different or new user interfaces prompting input for different properties or different values of properties may be updated based on determinations like that above, or based on which properties of a housing unit can and cannot be obtained from a $3^{rd}$ party source, and the like, to obtain additional granularity for a housing unit that influences consumption rates of different goods.

In some embodiments, some users may be presented with less granular options and other users may be presented with more granular options, or different possible values, for one or more properties and a quality measure for an estimate of consumption based on the respective set of options may be determined based on difference in time to convergence of an initial prediction of consumption to determined consumption for different users that were presented different options. Given the complexity of individual use that factors into consumption rates, it is expected that an initial consumption prediction provides a starting point for a household that is then refined based on user feedback. However, an initial consumption prediction should be relatively accurate and ideally predicts consumption within a range of accuracy such that, for example, a household does not consume more than the amounts of goods predicted plus a buffer amount. Additionally, embodiments may predict a buffer amount in association with a consumption amount. In some cases, the buffer amount may be based on household properties, or may be based on a weighted percentage of consumption of a given good.

Figure 4:
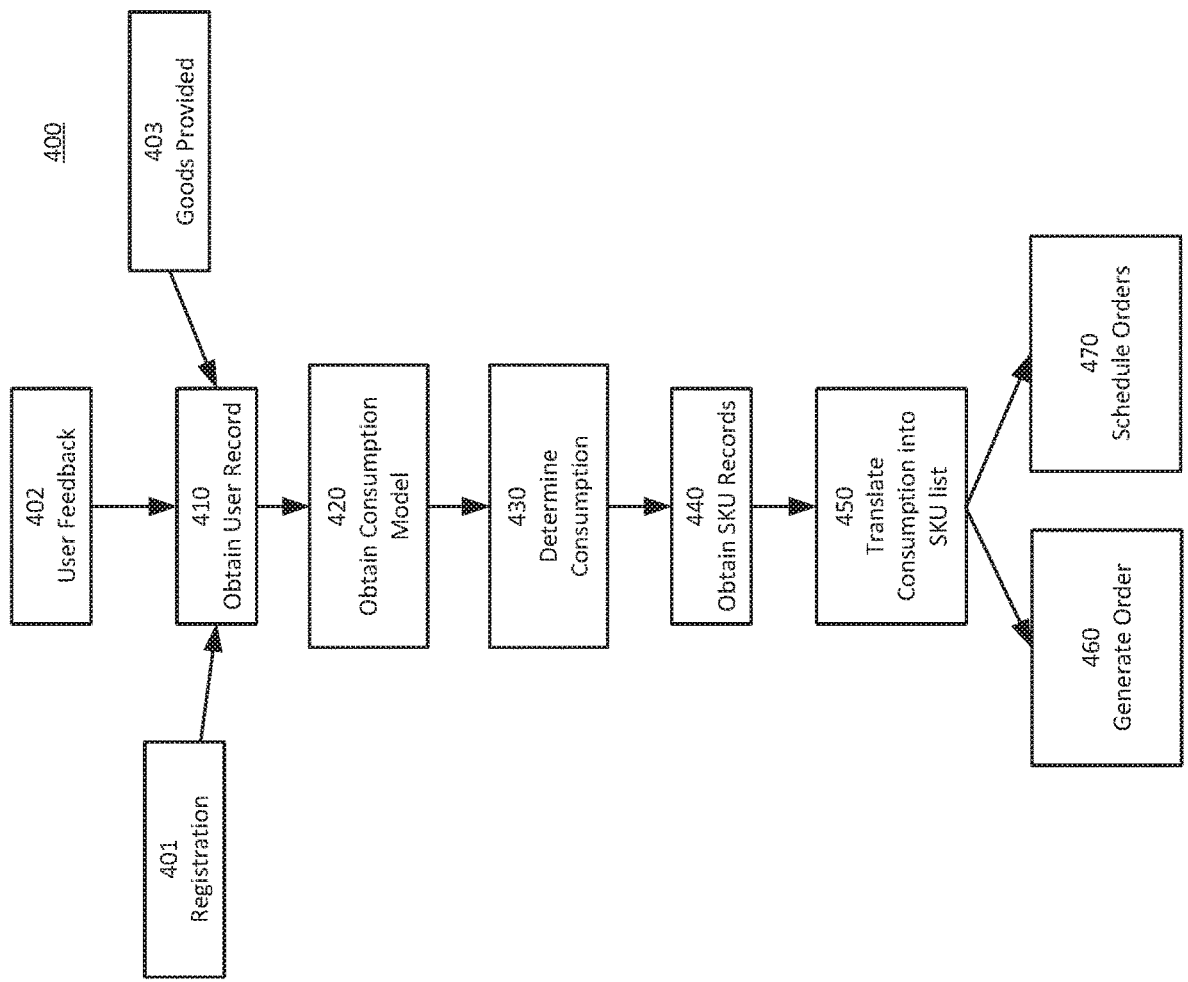
FIG. 4 illustrates an example flow diagram for determining user consumption of packaged goods in accordance with the present techniques.

FIG. 4 illustrates an example flow diagram of a process 400 determining user consumption of goods in accordance with the present techniques. The process 400 may be performed in some embodiments of the above-described subscription server 120. For example, the process 400 may be executed by a subscription server 120 within a computing environment like the examiner computing environment 100. The process 400 may determine consumption metrics for physical goods to which a user subscribes for delivery in accordance with the above-described techniques to mitigate certain problems that often arise with subscriptions to physical goods. The process 400 may determine consumption metrics for physical goods to which a user subscribes iteratively, such as over a week, month, year, or longer, in accordance with a delivery schedule, household properties, amounts of goods shipped, implicit and explicit user feedback, and other factors as outlined herein. In various embodiments, the process 400 may include determinations by one or more models, such as by consumption model(s), which may be iteratively trained (e.g., updated) based on information like that described above and other factors as outlined herein. In some cases, consumption models may be user specific, and a data store may include different models for different users. In some cases, a data store may include user specific model data (e.g., one or more weights, values, etc.) by which corresponding features of a more generic (e.g., to multiple users, not necessarily in complexity) consumption model may be adjusted prior to, or at, run-time to configure the consumption model for determinations in the process 400. Instructions (e.g., computer code) for performing the process 400 may be stored on a tangible, non-transitory, machine-readable medium such that when instructions on the medium are executed by a data processing apparatus, an example of which is described below with reference to FIG. 8, the steps of process 400 may be performed. Similar encoding may be used for the other processes described herein. A single instance of process 400 is shown in FIG. 4, but it should be understood that in commercial embodiments, likely many instances, for example, several hundred or several thousand, instances of process 400 may be in various stages of execution simultaneously, such as to concurrently process different data in different instances and stages of process 400 to determine results. For example, different instances of process 400 may be executed concurrently, be in different stages of execution, and process respective data (e.g., to determine results pertaining to a given user or subset of users) in order to service as a user base numbering in the thousands, hundreds of thousands, or millions which may be geographically dispersed and for which availability of goods in different geographic areas may differ.

To reduce latency in some determinations, such as for initial consumption, certain steps may be done in advance as a batch process. For example, determinations pertaining to existing user records, like clustering of records and generation of a model for initial consumption determinations, may be performed prior to a determination of initial consumption for a newly registered user. Generally, users expect a response with low latency, so some embodiments may make this decision in less than 50-milliseconds to avoid damaging the user experience (though embodiments may also take longer).

In addition to pre-processing of clusters or a model of initial prediction (which in some cases may be a weighting a nearby clusters) for determinations of initial consumption for users during a registration process, embodiments may use a high-performance data structure that is keyed by user, such as a hash table, with a key value based on a model identifier (or model data identifier) by which determinations of consumption may be performed in less than 50-milliseconds to avoid damaging user experience, such as when a user submits registration information and waits for a response regarding a determined consumption of goods to which the user wishes to subscribe (which may include recomputing determinations in response to altered values and the like). For example, such performance metrics may be met by such techniques to update a user interface or otherwise process user input, like user feedback or other user input values, or other values (e.g., obtained from $3^{rd}$ parties or otherwise), which affect a determination of consumption for the user and which may be used to update a determination consumption for the user.

Similarly, information about goods may be stored in a high-performance data structure that is keyed by good-location (or other combination of information, such as good-brand, good-brand-version), such as a hash table, with a key value (or values) based on a SKU (or SKUs) with which a count (or amount) of the good (e.g., for a particular brand and version thereof being available to ship to a given location) is associated such that a SKU listing may be determined for generating an order based on determined consumption for a user, and such operations may be performed in less than 50-milliseconds to avoid damaging user experience. In some embodiments, information about the efficacy of a given good (e.g., brand and version thereof) relative to a baseline efficacy of the good (e.g., as may be reported by a consumption model result) may be stored in a high-performance data structure that is keyed by good-brand-version, such as a hash table, with a key value (or values) indicative of the difference of the good-brand-version relative to the baseline efficacy.

The process 400 begins in this embodiment with obtaining a user record 410 of a user. The user record for the user may be formed during a registration process 401 and include at least some household properties and at least some goods preference properties. As the user interacts with the system and receives shipments of goods, information about user feedback 402 and goods provided 403 to the user may be processed to update the user record of the user. Thus, for example, the obtained user record 410 may comprise a current set of information for the user for which the process 400 is being executed (e.g., to determine an initial consumption or to determine a next shipment, etc.). In some embodiments, the obtained user record 410 comprises one or more vectors, linked list, tree, matrix, or other data structure within which data utilized in the process 400 is encoded. For example, the user record may include ones or more vectors describing the user's household (e.g., Household: <Vector>), like one or more feature vectors. Other vectors may encode other information, such as data about user feedback 402, or data about goods provided 403. Embodiments may combine information for the different datasets described above into a single vector or other data structure, or utilize multiple data structures for the different datasets.

In some embodiments, such as based on the obtained user record 410, a data structure corresponding to model inputs may be populated. In some cases, information in data structures of the user record may be translated into the data structure for processing by a model. It is expected that properties in a set of properties which are processed by a model may change, such as to include additional or other properties, and in some cases reduced, such as to omit a property which the model no longer uses. Further, data collected during registration 401, such as for one or more properties in an initial set of properties which are processed to determine an initial consumption for a user, may similarly change over time. Accordingly, a translation step may afford consistency of structuring model inputs without burdening users to update a user record.

Next, the process may include obtaining 420 a consumption model by which information included in or determined about the user record is processed. In some embodiments, such as based on the obtained user record 410, a data structure corresponding to model inputs may be populated. In some cases, information in data structures of the user record may be translated into the data structure for processing by a model. It is expected that properties in a set of properties which are processed by a model may change, such as to include additional or other properties, and in some cases reduced, such as to omit a property which the model no longer uses. Further, data collected during registration 401, such as for one or more properties in an initial set of properties which are processed to determine an initial consumption for a user, may similarly change over time. Accordingly, a translation step may afford consistency of structuring model inputs without burdening users to update a user record.

In some embodiments, a user-specific consumption model may be obtained 420. A user-specific consumption model may be a version of a model (e.g., a file, or biases, or weights for a model) determined to minimize error for the household of the user. In some cases, the model may be selected based on a model determined to minimized error for a cluster to which the user record has a minimal distance (e.g., minimizes error for households to which the household of the user is determined to be similar). Thus, a user-specific consumption model need not be specific to the particular user but rather may be determined to minimize error for households which are determined to be similar to that of the user. In other cases, a non-user specific model may be utilized, but which may determine consumption based on a set of properties augmented based on the clustering process (e.g., by populating values for the household of the user based on measures of similarity to other households, like a cluster thereof). Here, too, a model (or weights or biases) determined to minimize error in consumption determines for households within a cluster or clusters may be employed.

At step 430, the process may determine consumption of different goods for the household corresponding to the user record based on the obtained 420 consumption model. For example, an input data structure, such as a feature vector (e.g., of input key-value pairs), may be provided as input to the consumption model 420 to obtain an output vector comprising output key-value pairs. The output key-value pairs may, for a good (e.g., as a key), indicate one or more values corresponding to the good, such as an amount of consumption and other properties. The output may comprise values (e.g., consumption amounts and optionally preferences) for a plurality of different goods, such as goods to which the user has elected to subscribe to or from which the user may elect to subscribe. In some cases, good preference property information may be populated based on information indicated by the user record.

At step 440, SKU records may be obtained. For example, a SKU record may be obtained based on a good identifier (e.g., as a key) and other properties, which may correspond to SKU record selection criteria. In some cases, a whole record may not be obtained, but rather at least some of the data therein obtained, like a SKU of a good and corresponding properties for the SKU, like a count of the good in the SKU. The SKUs retrieved for a good may be SKUs having a count within a threshold amount of consumption of the good. SKUs for different versions or brands may be obtained where those SKUs satisfy criteria corresponding to the household preference properties for the good.

At step 450, consumption amount for a respective good may be translated into a SKU list, like a set of SKUs which satisfy the consumption for the respective good. One or more sets of SKUs, like a combination of SKUs, may be determined to satisfy consumption for a good. At least one SKU list may be determined for each good for which consumption of the household was determined. In some embodiments, a user interface may be generated based in part on the SKU listings. For example, an interface by which a user may adjust or modify an order may be populated to indicate, for each good, an amount, brand, and version of the good selected to meet the consumption of the household of the user. In some embodiments, the user may modify brand or version of a good via the interface, such as by selection of another brand or version corresponding to a different SKU listing. Thus, for example, a user may confirm which brand and version of a good the user is to receive. An amount of the good the user is to receive may be based on different combinations of SKUs corresponding to the brand and version based on available SKUs (e.g., a user may be restricted to incrementing an amount by a count of 1 if a smallest count of the good for a SKU is 2). The final brand-version selections of the user, each having a corresponding SKU listing, may be processed for order generation, such as to indicate a final listing of the various SKUs for the collection goods to be included in the order when fulfilled. In some embodiments, the SKU listings for the respective goods may be processed based on an objective function to satisfy volumetric and weight objectives for order fulfillment. In some embodiments, a user interface may be updated to reflect any amount changes based on the optimization and indicate any savings based on changes (e.g., for the current fulfillment period, next fulfillment period, or across two or more fulfillment periods) in newly proposed amounts (which still satisfy determined consumption but for which amounts are optimized across two or more proposed shipments). Thus, for example, in some embodiments, which SKUs to include in which order may be optimized within certain constraints while meeting consumption amounts for the different goods.

User confirmation of the order (e.g., which may be explicit such as when process 400 is executed in association with registration 401 or performed automatically in some cases for future fulfillments) may be processed to generate 460 an order for fulfillment (e.g., including those goods which satisfy at least determined consumption amounts for the current period prior to a next shipment) and one or more scheduled orders 470 (e.g., a next order prediction or bulk schedule prediction) based the current order fulfillment and current consumption prediction. Each of these data component may be stored in the user record, and the generated order 460 is fulfilled for shipment to the user (e.g., by shipping the selected SKUs).

In some embodiments, the subscription server 120 may generate one or more user interfaces for presentation to a user via a web site, which may be accessed via a web browser (e.g., like a native application 115 including browser functionality, or which may be a web browser application). In other embodiments, a native application 115 may be configured to generate and present one or more interfaces and transmit collected information to the subscription server 120, such as via an API, like the API for receiving user feedback or other API (e.g., of the subscription server 120) providing similar functionality. One or more interfaces, such as those described below, may correspond to the above described process and other aspects of the discloser.

Figure 5:
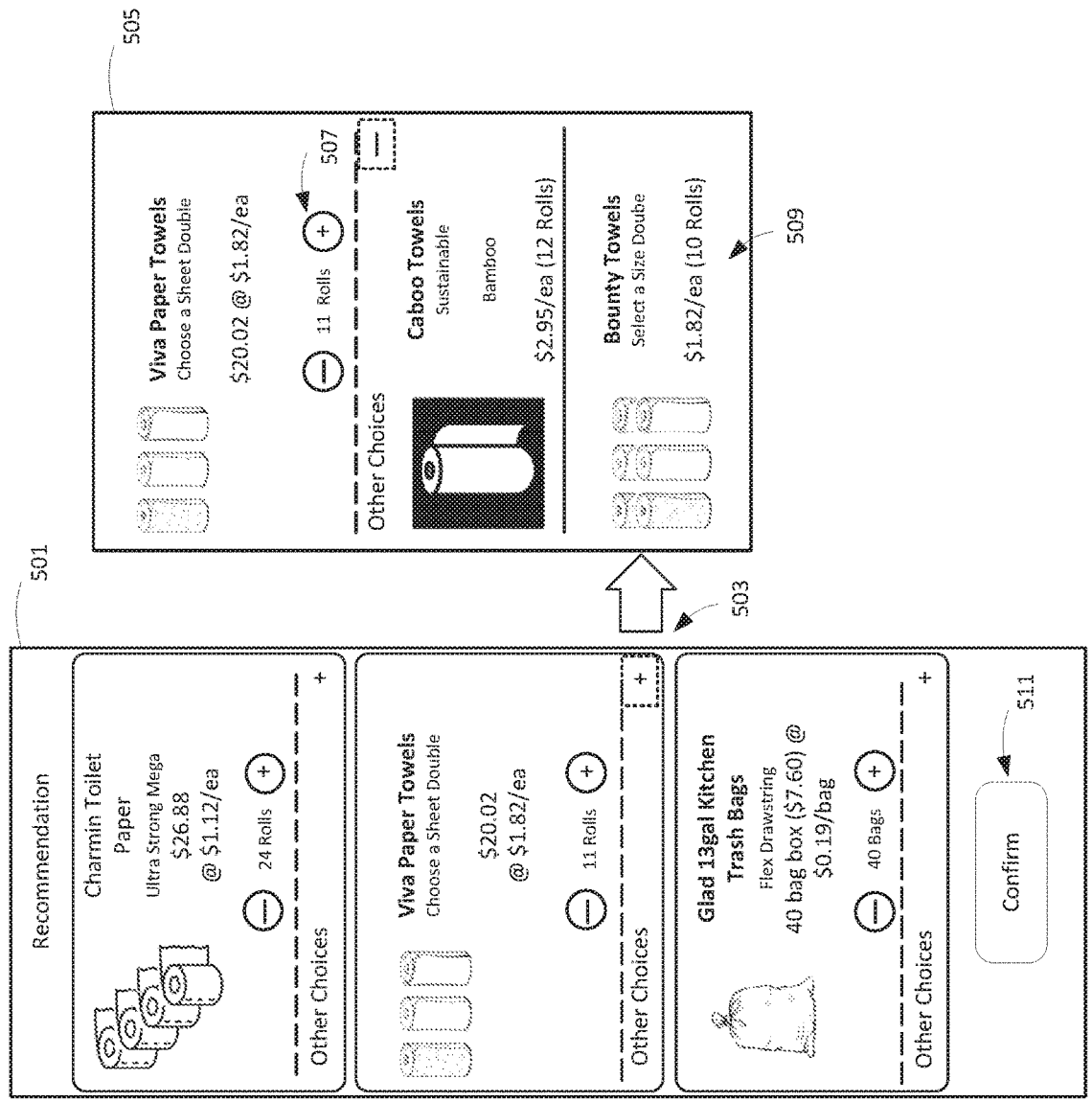
FIG. 5 illustrates an example user interface including an initial recommendation of packaged goods based on a determined user consumption and a workflow for modifying the initial recommendation of packaged goods, in accordance with some embodiments.

FIG. 5 illustrates an example user interface including an initial recommendation of packaged goods based on a determined user consumption and a workflow for modifying the initial recommendation of packaged goods, in accordance with some embodiments.

Information obtained through the registration of a new user, which may be augmented over time via user feedback and information about provided goods for an existing user, may be processed to generate a recommendation 501 of subscription goods (e.g., as described with reference to FIG. 4). The recommendation 501 interface may indicate recommended amounts of respective goods. The amounts may be based on SKU combinations which are deliverable to the household of the user. For example, the amount of 11 rolls of viva paper towels may be based on an 8 roll SKU and a 3 roll SKU, or a 10 roll SKU and 1 roll SKU, and so on. Increasing/decreasing an amount for the good may be based on a smallest deliverable SKU for the good or next possible combination that is higher or lower than the current amount. In some embodiments, adjusting an amount above a threshold, such as more than threshold above a predicted consumption, like 1.2 to 1.5 times a predicted consumption amount may cause a feedback prompt, such as "Thanks, why do you need more paper towels?" from which an example selection from, e.g., I think I need more generally, I'm totally out, I'm having guests, I'm not sure, may be selected by the user. Alternative, adjusting an amount below a threshold, like below 1.2 to 1.5 times a predicted consumption amount may cause a feedback prompt, such as "Thanks, why do you not need paper towels, you're predicted to use X amount?" from which an example selection from, e.g., I think I need less generally, I'm going on vacation, I'm not sure, may be selected by the user. The provided feedback may be stored in association with a record for the user and may further cause the subscription server 120 to schedule a follow-up feedback regarding the amount.

Alternative choices for a good may be presented in a similar fashion, which a user may view, such as by selection of other choices option 503. Selection of the other choice option may cause the generation of an alternative choices interface pane 505, which may display other options determined to satisfy preferences of the user and consumption amount. Within the pane 505 the user may select from other available options 509 and adjust an amount to receive. When finished, or without adjusting the recommendation 501, the user may confirm 511 the goods and projected amounts which may be received in a shipment.

Figure 6:
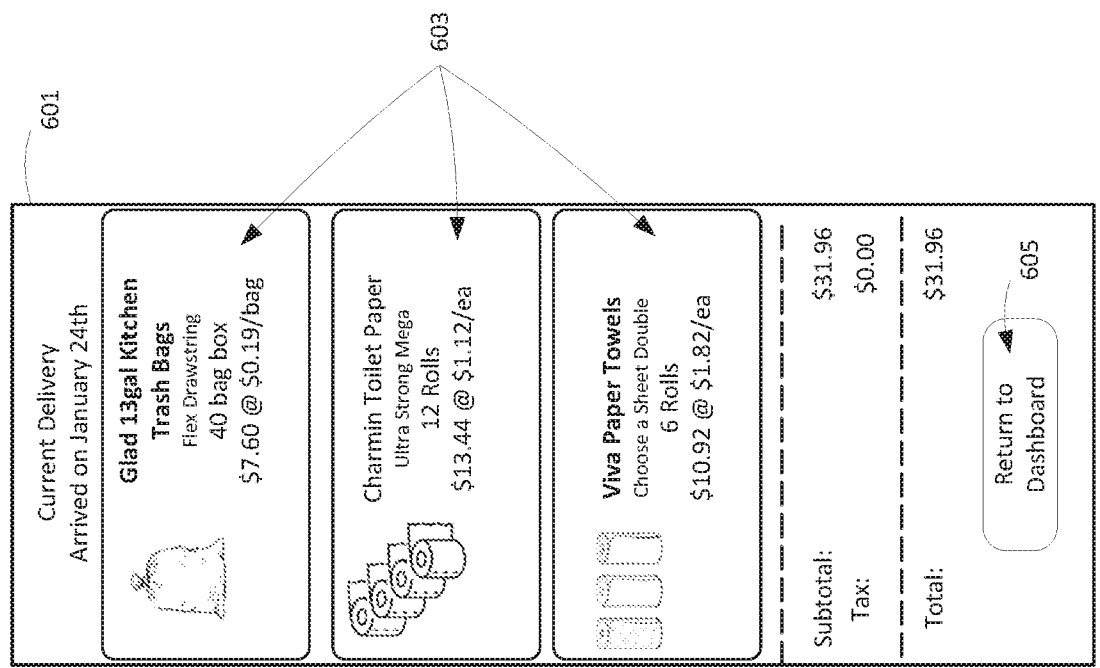
FIG. 6 illustrates an example user interface including a view of a current delivery of packaged goods, which may be accessed via a dashboard, in accordance with some embodiments.

FIG. 6 illustrates an example user interface including a view of a current delivery of packaged goods, which may be accessed via a dashboard, in accordance with some embodiments.

The current delivery interface 601 may include goods and amounts of goods 603 which have been sent for fulfillment or which the user has already received. A total amount of the order may be included. The example interface may be access via a dashboard 605 which may include an option to access the current delivery interface 601 or a next delivery interface as described below. The goods and amounts may be determined via processes described with reference to FIG. 4 and fulfilled to satisfy determined consumption of those goods by a household.

Figures 7A, 7B:
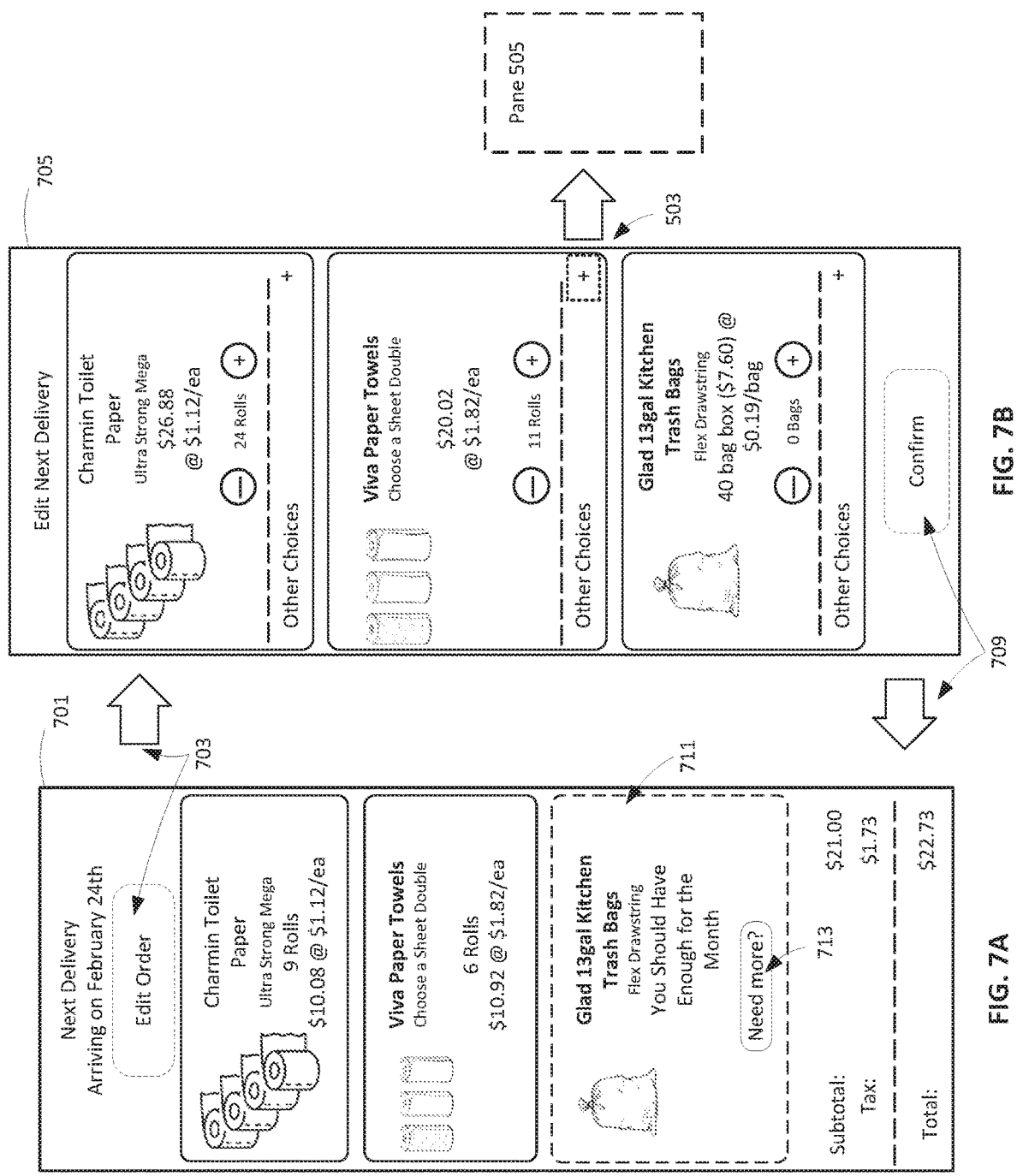
FIG. 7A illustrates an example user interface including a view of a next delivery of packaged goods, which may be accessed via a dashboard, and updated based on predicted consumption, in accordance with some embodiments.
FIG. 7B illustrates example user interface including a view of a next delivery of packaged goods, which may be accessed via a dashboard, and updated by a user, in accordance with some embodiments.

FIG. 7A illustrates an example user interface including a view of a next delivery of packaged goods, which may be accessed via a dashboard, and updated based on predicted consumption, in accordance with some embodiments.

The next delivery interface 701 may include various options for modifying a next order that is not yet fulfilled, like a next scheduled order. The next delivery interface 701 may include a bulk goods information pane 711 that includes schedule information about bulk goods which are either included or not included in the next delivery. For example, a representation of the bulk good may be greyed out to indicate that it is not included in the next shipment and information indicative of a future shipment or time period for next delivery for the bulk good may be indicated. The user may be provided with a selectable interface element to add a given bulk good 713.

The next delivery interface 701 may also include a selectable user interface option by which a user may edit 703 an order. The edit option may cause the generation of an editing pane within which the user may adjust amounts of respective goods, FIG. 7B illustrates example user interface including a view of a next delivery of packaged goods, which may be accessed via a dashboard, and updated by a user, in accordance with some embodiments.

An example editing pane 705 is shown. Within the editing pane 705 a user may adjust amounts of respective goods, such as based on available SKU combinations. Increasing/decreasing amounts may occur as described with reference to FIG. 5. Further, the user may elect to a different brand or version of a good, such as described with reference to FIG. 5 and elements 503 and pane 505. Further, as described with reference to FIG. 5, feedback prompts may be generated based on modifications of amounts within the editing pane 705. Further, a switch to a different product may cause the generation of a prompt for feedback regarding the switch. In some embodiments, a switch may be recommended to the user, e.g., to reduce cost, A-B testing, or based on other criteria. The user may confirm 709 any modifications such that they are included in the next delivery.

Figure 8:
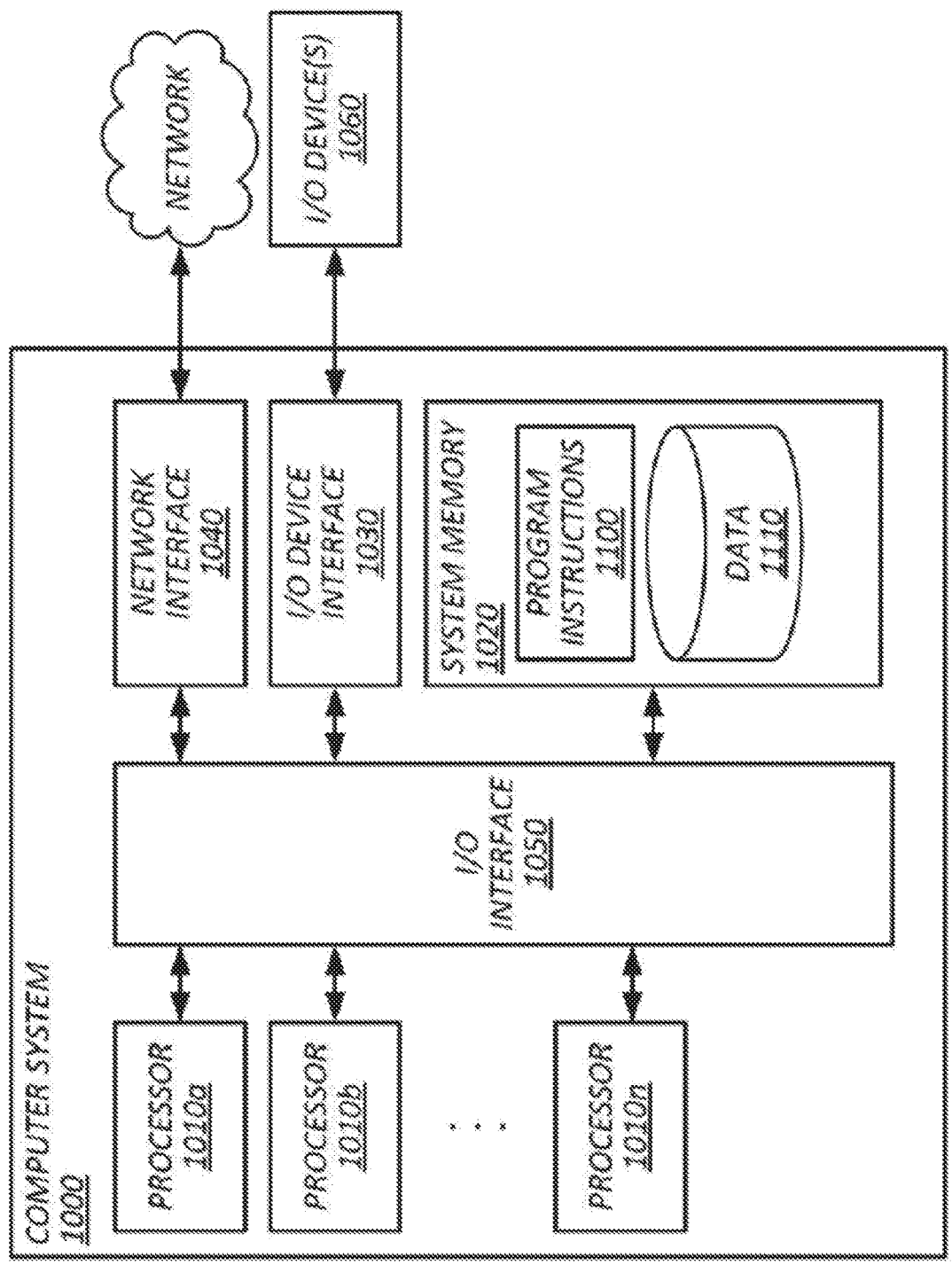
FIG. 8 illustrates an example computing system upon which the present techniques may be implemented.

FIG. 8 is a diagram that illustrates an example computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000. For example, the computing system 1000, components thereof, or a collection of computing systems, may be operable to perform one or more operations and/or included in one or more entities to perform those functions. For example, computing systems like computing system 1000 may be utilized to store and process data like that illustrated with respect to FIGS. 2 and 3, such as according to example steps shown in FIG. 4, and may be organized in an architecture like that illustrated in FIG. 1. Thus, one or more computing systems 1000 may be utilized to perform operations with respect to subscription services, such as determining a predicted amount of an item that will be consumed, adjusting a predicated amount based on past fulfilled orders and user feedback, and scheduling future orders based on predicated amounts, and the like, using techniques disclosed herein. Example elements of an example computing system are discussed in greater detail below.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010$a$), or a multi-processor system including any number of suitable processors (e.g., 1010$a$-1010$n$). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010$a$-1010$n$) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine-readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010$a$-1010$n$) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010$a$-1010$n$, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010$a$-1010$n$). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a datacenter, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory computer-readable storage medium comprising computer program instructions that when executed by one or more processors effectuate operations comprising: obtaining, in a database, a plurality of user records, each record comprising household properties having corresponding values and consumption amounts for goods; forming, from the plurality of user records, a training set and a validation set; training, based on the training set, a consumption model configured to output, based on input values for a set of a plurality of household properties represented in the training records, determined consumption amounts for respective goods represented in the training records, wherein the model minimizes error of output determined consumption amounts relative to the consumption amounts for goods in at least some of the user records in the validation set; obtaining a new user record comprising at least some household properties having corresponding values; determining, with the consumption model based on the new user record, a predicted consumption amount for each good in a set of goods; obtaining, for a good in the set of goods, at least one stock record indicative of at least one stock keeping unit (SKU) having a count of the good that satisfies in whole or in part the predicted consumption amount for the good, wherein at least one SKU is obtained for each good in the set of goods and a combination of SKUs is obtained for at least some of the goods in the set of goods; generating, for the set of goods, an order comprising a plurality of SKUs indicated in obtained stock records for which a total count of one or more SKUs corresponding to respective ones of the goods meet the predicted consumption amount for the good without exceeding a threshold; and submitting the generated order for fulfillment.
2. The medium of embodiment 1, the operations further comprising: determining, based on the plurality of user records, amounts of consumption of different ones of the goods attributable to respective ones of a plurality of household properties represented in at least some of the records.
3. The medium of embodiment 2, the operations further comprising: identifying, for a given good, a household property or household property value pairing indicative of a change in an amount of consumption of the given good.
4. The medium of embodiment 3, the operations further comprising: scoring, for the given good, the household property based the change in the amount of consumption of the given good relative to other changes in the amount of consumption of the given good identified for other household properties; and selecting a given household property to include in a reduced set of household properties based on a plurality of scores, wherein the at least some household properties in the new user record correspond to the reduced set of household properties.

5. The medium of embodiment 3, the operations further comprising: scoring, for the given good, the household property value pairing based the change in the amount of consumption of the given good relative to other changes in the amount of consumption of the given good identified for other household property value pairings; and selecting a reduced set of possible values for the household property based on a plurality of scores, wherein the at least some household properties in the new user record include the household property having a value in the reduced set of possible values.

6. The medium of any of embodiments 1-5, wherein determining, with the consumption model based on the new user record, a predicted consumption amount for each good in a set of goods comprises: forming a plurality of clusters based on the plurality of user records, wherein each cluster comprises at least some user record identified to the cluster based on their respective values for the at least some household properties; determining, based on the respective values of the at least some household properties in the new user record and respective values representative of the at least some household properties of at least some of the clusters, distances between the user record and the at least some of the clusters to identify a closest one of the clusters based on the distances; and adding, to the at least some of the household properties, other household properties with corresponding values based on user records in the closest one of the clusters.

7. The medium of any of embodiments 1-6, wherein: the at least some of the household properties is a reduced set of household properties for which corresponding values are obtained in association with registering a new user corresponding to the new user record, and values for at least some other household properties are determined for the user record prior to determining the predicted consumption amount for each good in the set of goods with the consumption model based on the new user record.

8. The medium of any of embodiments 1-7, the operations further comprising: updating the new user record based on the generated order; determining a first feedback prompt corresponding to a first good in the set of goods; updating the new user record based on received user feedback responsive to the prompt; determining, with the consumption model based on the updated user record, a next predicted consumption amount for each good in a set of goods during a next consumption period; updating the new user record based on a next generated order submitted for fulfilment for the next consumption period; and determining a second feedback prompt corresponding to a different good in the set of goods based on an amount of change in the next predicted consumption amount for the different good relative to the previously predicted consumption amount.

9. The medium of embodiment 8, wherein determining a second feedback prompt corresponding to a different good in the set of goods based on an amount of change in the next predicted consumption amount for the different good relative to the previously predicted consumption amount comprises: determining amounts of change in the next predicted consumption amounts for one or more of the goods in the set different from the first good; and determining to generate the second feedback prompt corresponding to the given one of the different goods based on the amounts of change and the amount of change for the given one of the different goods exceeding a threshold of change.

10. The medium of any of embodiments 1-9, the operations further comprising: training a plurality of consumption models; determining that a given one of the consumption models minimizes error of output determined consumption amounts relative to the consumption amounts for goods in at least some different collections of user records in the validation set, wherein the different collections of user records correspond to different clusters of user records; and determining, based on the respective values of the at least some household properties in the new user record and respective values representative of the at least some household properties of the different clusters, distances between the user record and the different clusters to identify a closest one of the clusters based on the distances.

11. The medium of embodiment 10, wherein determining, with the consumption model based on the new user record, a predicted consumption amount for each good in a set of goods comprises: selecting the consumption model from the plurality of consumption model; and the selected consumption model corresponding to the given one of the consumption models determined to minimize error for user records in the closest one of the clusters.

12. The medium of any of embodiments 1-11, the operations further comprising: determine one or more prompts for user feedback corresponding to household properties different from the at least some household properties included in the new user record; transmitting the one or more prompts for user feedback to a user device of the user associated with the new user record; updating the new user record based on received user feedback: determining a measure of accuracy of current consumption amounts of goods determined for the updated user record based in part on the feedback; and identifying the updated user record to the training set or the validation set based on the measure of accuracy.

13. The medium of embodiment 12, the operations further comprising: training a new consumption model that minimizes error of output determined consumption amounts relative to the current consumption amounts of goods determined for the updated user record; and determining, with the new consumption model based on the updated user record, for a next fulfillment period, an updated predicted consumption amount for each good in the set of goods.

14. The medium of embodiment 13, wherein: user records identified to the training set comprise historical consumption amounts associated with dates and corresponding geolocations of households of users corresponding to the user records; the next fulfillment period is associated with at least one date; and the updated predicted consumption amount for each good in the set of goods for the next fulfillment period differs for at least some goods for different dates received as input to the new consumption model.

15. The medium of any of embodiments 1-14, wherein: user records identified to the training set comprise historical consumption amounts associated with dates and corresponding geolocations of households of users corresponding to the user records; the predicted consumption amount for each good in a set of goods is determined for a fulfillment period associated with at least one date; and the predicted consumption amount for each good in the set of goods for the next fulfillment period differs for at least some goods for different dates received as input to the consumption model.
16. The medium of embodiment 15, wherein: the at least one date is a range of dates, the range of dates comprising a number of weekend days and a number of weekdays, and the predicted consumption amount for each good in the set of goods for the next fulfillment period differs for different ratios of weekend days to weekdays.
17. The medium of embodiment 15, wherein: the at least one date corresponds to a season in a set of seasons, and the predicted consumption amount for each good in the set of goods for the next fulfillment period differs for different seasons in the set of seasons.
18. The medium of any of embodiments 1-17, the operations further comprising: identifying, for a good in the set of goods, a plurality of SKUs or combinations of SKUs having a total count of the good that meets the predicted consumption amount for the good or exceeds the predicted consumption amount for the good within a threshold amount; and identifying, for at least some other goods in the set of goods, a plurality of SKUs or combinations of SKUs having a total count of the good that meets the predicted consumption amount for the good or exceeds the predicted consumption amount for the good within a threshold amount.
19. The medium of embodiment 18, wherein generating, for the set of goods, an order comprising a plurality of SKUs indicated in obtained stock records for which a total count of one or more SKUs corresponding to respective ones of the goods meet the predicted consumption amount for the good without exceeding a threshold comprises: selecting, for each good in the set of goods, from one or more SKUs identified for the good, a SKU or a combination of SKUs that meets the predicted consumption amount for the good without exceeding a threshold and that, collectively, with other SKUs or combination of SKUs selected for other goods in the set of goods that meet the respective predicted consumption amount without exceeding a respective threshold, satisfy volumetric and weight criteria for order fulfillment.
20. The medium of embodiment 18, the operations further comprising: updating the user record to include indications of total counts which exceeded the predicted consumption amount for the respective goods, wherein a next fulfilled order includes less than the predicted consumption amount for one or more of the respective goods based on the corresponding excess.
21. A method, comprising: executing the operations of any of embodiments 1-20 with a computer system.
22. A computer-implemented method, the method comprising: obtaining, in a database, a plurality of user records, each record comprising household properties having corresponding values and consumption amounts for goods; forming, from the plurality of user records, a training set and a validation set; training, based on the training set, a consumption model configured to output, based on input values for a set of a plurality of household properties represented in the training records, determined consumption amounts for respective goods represented in the training records, wherein the model minimizes error of output determined consumption amounts relative to the consumption amounts for goods in at least some of the user records in the validation set; obtaining a new user record comprising at least some household properties having corresponding values; determining, with the consumption model based on the new user record, a predicted consumption amount for each good in a set of goods; obtaining, for a good in the set of goods, at least one stock record indicative of at least one stock keeping unit (SKU) having a count of the good that satisfies in whole or in part the predicted consumption amount for the good, wherein at least one SKU is obtained for each good in the set of goods and a combination of SKUs is obtained for at least some of the goods in the set of goods; generating, for the set of goods, an order comprising a plurality of SKUs indicated in obtained stock records for which a total count of one or more SKUs corresponding to respective ones of the goods meet the predicted consumption amount for the good without exceeding a threshold; and submitting the generated order for fulfillment.
23. A computer-implemented method for fulfilling user subscriptions to one or more goods provided by a subscription service: obtaining, in a database, a plurality of user records, each record comprising household properties having corresponding values and consumption amounts for goods; determining, based on the user records, amounts of consumption of different ones of the goods attributable to respective ones of the household properties for a respective set of possible values; obtaining, for a user registering with a subscription service, a new user record comprising at least some of the household properties and having corresponding values for the household properties selected from the respective set of possible values; determining, based on the new user record, a predicted consumption amount for each good in a set of goods based on the determined amounts of consumption of the different ones of the goods attributable to each of the at least some of the household properties based on their corresponding values; obtaining, for a good in the set of goods, at least one stock record indicative of at least one stock keeping unit (SKU) having a count of the good that satisfies in whole or in part the predicted consumption amount for the good, wherein at least one SKU is obtained for each good in the set of goods and a combination of SKUs is obtained for at least some of the goods in the set of goods; generating, for the set of goods, an order comprising a plurality of SKUs indicated in obtained stock records for which a total count of one or more SKUs corresponding to respective ones of the goods meet the predicted consumption amount for the good without exceeding a threshold; and submitting the generated order for fulfillment.
24. A non-transitory computer-readable storage medium comprising computer program instructions that when executed by one or more processors effectuate operations comprising: the operations of embodiments 22 or 23.

What is claimed is:
1. A method, the method comprising:
obtaining, with a computer system, in a database, a plurality of user records, each record comprising household attributes having corresponding values and consumption amounts for goods;
forming, with the computer system, from the plurality of user records, a training set and a validation set;
obtaining, with the computer system, a consumption model, the consumption model being trained based on the training set and configured to output, based on input values for a set of a plurality of household attributes represented in the training records, determined consumption amounts for respective goods represented in the training records, wherein the model minimizes error of output determined consumption amounts relative to the consumption amounts for goods in at least some of the user records in the validation set;

obtaining, with the computer system, a new user record comprising at least some household attributes having corresponding values;

determining, with the computer system, with the consumption model based on the new user record, a predicted consumption amount for each good in a set of goods;

obtaining, with the computer system, for a good in the set of goods, at least one stock record indicative of at least one stock keeping unit (SKU) having a count of the good that satisfies in whole or in part the predicted consumption amount for the good, wherein at least one SKU is obtained for each good in the set of goods and a combination of SKUs is obtained for at least some of the goods in the set of goods;

generating, with the computer system, for the set of goods, an order comprising a plurality of SKUs indicated in obtained stock records for which a total count of one or more SKUs corresponding to respective ones of the goods meet the predicted consumption amount for the good without exceeding a threshold;

submitting, with the computer system, the generated order for fulfillment;

updating the new user record based on the generated order;

determining a first feedback prompt corresponding to a first good in the set of goods;

updating the new user record based on received user feedback responsive to the prompt;

determining, with the consumption model based on the updated user record, a next predicted consumption amount for each good in a set of goods during a next consumption period;

updating the new user record based on a next generated order submitted for fulfilment for the next consumption period; and determining a second feedback prompt corresponding to a different good in the set of goods based on an amount of change in the next predicted consumption amount for the different good relative to the previously predicted consumption amount, wherein determining a second feedback prompt corresponding to a different good in the set of goods based on an amount of change in the next predicted consumption amount for the different good relative to the previously predicted consumption amount comprises:

determining amounts of change in the next predicted consumption amounts for one or more of the goods in the set different from the first good; and determining to generate the second feedback prompt corresponding to the given one of the different goods based on the amounts of change and the amount of change for the given one of the different goods exceeding a threshold of change.

2. The method of claim 1, comprising:
fulfilling the generated order.

3. The method of claim 1, further comprising:
determining, based on the plurality of user records, amounts of consumption of different ones of the goods attributable to respective ones of a plurality of household attributes represented in at least some of the records.

4. The method of claim 3, further comprising:
identifying, for a given good, an attribute or attribute value pairing indicative of a change in an amount of consumption of the given good.

5. The method of claim 4, further comprising:
scoring, for the given good, the attribute based the change in the amount of consumption of the given good relative to other changes in the amount of consumption of the given good identified for other attributes; and selecting a given attribute to include in a reduced set of attributes based on a plurality of scores, wherein the at least some attributes in the new user record correspond to the reduced set of attributes.

6. The method of claim 4, further comprising:
scoring, for the given good, the attribute value pairing based the change in the amount of consumption of the given good relative to other changes in the amount of consumption of the given good identified for other attribute value pairings; and selecting a reduced set of possible values for the attribute based on a plurality of scores, wherein the at least some attributes in the new user record include the attribute having a value in the reduced set of possible values.

7. The method of claim 1, wherein determining, with the consumption model based on the new user record, a predicted consumption amount for each good in a set of goods comprises:

forming a plurality of clusters based on the plurality of user records, wherein each cluster comprises at least some user records identified to the cluster based on their respective values for the at least some household attributes;

determining, based on the respective values of the at least some attributes in the new user record and respective values representative of the at least some attributes of at least some of the clusters, distances between the user record and the at least some of the clusters to identify a closest one of the clusters based on the distances; and adding, to the at least some of the attributes, other attributes with corresponding values based on user records in the closest one of the clusters.

8. The method of claim 1, wherein:
the at least some of the household attributes is a reduced set of attributes for which corresponding values are obtained in association with registering a new user corresponding to the new user record, and values for at least some other attributes are determined for the user record prior to determining the predicted consumption amount for each good in a set of goods based on the new user record.

9. The method of claim 1, further comprising:
training a plurality of consumption models;
determining that a given one of the consumption models reduces error of output determined consumption amounts relative to the consumption amounts for goods in at least some different collections of user records in the validation set, wherein the different collections of user records correspond to different clusters of user records; and determining, based on the respective values of the at least some household attributes in the new user record and respective values representative of the at least some attributes of the different clusters, distances between the user record and the different clusters to identify a closest one of the clusters based on the distances.

10. The method of claim 9, further comprising:
selecting the consumption model from the plurality of consumption models as part of the training.

11. The method of claim 1, further comprising:
determining a measure of accuracy of current consumption amounts of goods determined for the updated user record based in part on the received feedback; and
identifying the updated user record to the training set or the validation set based on the measure of accuracy.

12. The method of claim 11, further comprising:
training a new consumption model that reduces error of output determined consumption amounts relative to the current consumption amounts of goods determined for the updated user record; and
determining, with the new consumption model based on the updated user record, for a next fulfillment period, an updated predicted consumption amount for each good in the set of goods.

13. The method of claim 12, wherein:
user records identified to the training set comprise historical consumption amounts associated with dates and corresponding geolocations of households of users corresponding to the user records;
the next fulfillment period is associated with at least one date; and
the updated predicted consumption amount for each good in the set of goods for the next fulfillment period differs for at least some goods for different dates received as input to the new consumption model.

14. The method of claim 11, wherein:
user records identified to the training set comprise historical consumption amounts associated with dates and corresponding geolocations of households of users corresponding to the user records;
the predicted consumption amount for each good in a set of goods is determined for a fulfillment period associated with at least one date; and
the predicted consumption amount for each good in the set of goods for the next fulfillment period differs for at least some goods for different dates received as input to the consumption model.

15. The method of claim 14, wherein:
the at least one date is a range of dates,
the range of dates comprising a number of weekend days and a number of weekdays, and
the predicted consumption amount for each good in the set of goods for the next fulfillment period differs for different ratios of weekend days to weekdays.

16. The method of claim 14, wherein:
the at least one date corresponds to a season in a set of seasons, and
the predicted consumption amount for each good in the set of goods for the next fulfillment period differs for different seasons in the set of seasons.

17. The method of claim 1, further comprising:
identifying, for a good in the set of goods, a plurality of SKUs or combinations of SKUs having a total count of the good that meets a predicted consumption amount for the good or exceeds the predicted consumption amount for the good within a threshold amount; and
identifying, for at least some other goods in the set of goods, a plurality of SKUs or combinations of SKUs having a total count of the good that meets the predicted consumption amount for the good or exceeds the predicted consumption amount for the good within a threshold amount.

18. The method of claim 17, wherein generating, for the set of goods, an order comprising a plurality of SKUs indicated in obtained stock records for which a total count of one or more SKUs corresponding to respective ones of the goods meet the predicted consumption amount for the good without exceeding a threshold comprises:
selecting, for each good in the set of goods, from one or more SKUs identified for the good, a SKU or a combination of SKUs that meets the predicted consumption amount for the good without exceeding a threshold and that, collectively, with other SKUs or combination of SKUs selected for other goods in the set of goods that meet the respective predicted consumption amount without exceeding a respective threshold, satisfy volumetric and weight criteria for order fulfillment.

19. The method of claim 17, further comprising:
updating the user record to include indications of total counts which exceeded the predicted consumption amount for the respective goods, wherein a next fulfilled order includes less than the predicted consumption amount for one or more of the respective goods based on the corresponding excess.

20. The method of claim 1, further comprising:
steps for predicting consumption amounts.

21. A method, comprising:
obtaining, with a computer system, in a database, a plurality of user records, each user record comprising attributes corresponding to a respective user's residence, and each user record having consumption amounts of goods attributed to the respective user's residence, at least some of the attributes including an overage of the goods from a previous consumption period;
forming, with the computer system, from the plurality of user records, a training set and a validation set;
training, with the computer system, based on the training set, a machine-learning model of consumption, wherein:
the trained machine-learning model is configured to output, based on a given set of attributes corresponding to a given user's residence, determined amounts of consumption of a plurality of respective goods over a period of time in a periodic schedule,
output of the trained machine-learning model is constrained to integer units of consumption amounts, the units being stock keeping units (SKU) of the respective good, at least some of the goods having multiple SKUs with different amounts of respective goods,
training the machine-learning model comprises iteratively adjusting parameters of the machine-learning model to reduce differences between determinations of the machine-learning model responsive to user records in the training set and corresponding consumption amounts in the training set, and
training comprises cross validating the trained model with the validation set;
obtaining, with the computer system, a new user record comprising at least some household attributes;
determining, with the computer system, with the trained machine-learning model, based on the new user record, a set of SKUs and corresponding counts of each SKU in the set of SKUs, wherein:
the set of SKUs and corresponding counts correspond to predicted consumption amount for each good in a set of goods attributable to a new user's residence over the period of time in the periodic schedule, the corresponding counts are constrained to integer units, and at least one SKU is determined for each good in the set of goods, and a combination of SKUs is determined for at least some of the goods in the set of goods; and storing, with the computer system, the set of SKUs and corresponding counts in memory in association with the new user record.

22. The method of claim 21, further comprising:

determining, based on the plurality of user records, amounts of consumption of different ones of the goods attributable to respective ones of a plurality of attributes represented in at least some of the records.

23. The method of claim 22, further comprising:

identifying, for a given good, an attribute or attribute value pairing indicative of a change in an amount of consumption of the given good.

24. The method of claim 23, further comprising:

scoring, for the given good, the attribute based the change in the amount of consumption of the given good relative to other changes in the amount of consumption of the given good identified for other attributes; and selecting a given attribute to include in a reduced set of attributes based on a plurality of scores, wherein the at least some attributes in the new user record correspond to the reduced set of attributes.

25. The method of claim 23, further comprising:

scoring, for the given good, the attribute value pairing based the change in the amount of consumption of the given good relative to other changes in the amount of consumption of the given good identified for other attribute value pairings; and selecting a reduced set of possible values for the attribute based on a plurality of scores, wherein the at least some attributes in the new user record include the attribute having a value in the reduced set of possible values.

26. The method of claim 21, wherein determining, with the trained machine-learning model based on the new user record, a predicted consumption amount for each good in a set of goods comprises:

forming a plurality of clusters based on the plurality of user records, wherein each cluster comprises at least some user records identified to the cluster based on their respective values for the at least some attributes;

determining, based on the respective values of the at least some attributes in the new user record and respective values representative of the at least some attributes of at least some of the clusters, distances between the user record and the at least some of the clusters to identify a closest one of the clusters based on the distances; and adding, to the at least some of the attributes, other attributes with corresponding values based on user records in the closest one of the clusters.

27. The method of claim 21, wherein:

the at least some of the attributes is a reduced set of attributes for which corresponding values are obtained in association with registering a new user corresponding to the new user record, and values for at least some other attributes are determined for the user record prior to determining the set of SKUs and corresponding counts of each SKU in the set of SKUs with the trained machine-learning model based on the new user record.

28. The method of claim 21, further comprising:

updating the new user record based on a generated order;

determining a first feedback prompt corresponding to a first good in the set of goods;

updating the new user record based on received user feedback responsive to the prompt;

determining, with the trained machine-learning model based on the updated user record, a next predicted set of SKUs and corresponding counts of each SKU in the set of SKUs to be consumed during a next consumption period in the periodic schedule;

updating the new user record based on a next generated order submitted for fulfilment for the next consumption period; and determining a second feedback prompt corresponding to a different good in the set of goods based on an amount of change in the next predicted consumption amount for the different good relative to the previously predicted consumption amount.

29. The method of claim 28, wherein determining a second feedback prompt corresponding to a different good in the set of goods based on an amount of change in the next predicted consumption amount for the different good relative to the previously predicted consumption amount comprises:

determining amounts of change in the next predicted consumption amounts for one or more of the goods in the set different from the first good; and determining to generate the second feedback prompt corresponding to the given one of the different goods based on the amounts of change and the amount of change for the given one of the different goods exceeding a threshold of change.

30. The method of claim 21, further comprising:

training a plurality of consumption models;

determining that a given one of the consumption models reduces error of output determined consumption amounts relative to the consumption amounts for goods in at least some different collections of user records in the validation set, wherein the different collections of user records correspond to different clusters of user records; and determining, based on the respective values of the at least some attributes in the new user record and respective values representative of the at least some attributes of the different clusters, distances between the user record and the different clusters to identify a closest one of the clusters based on the distances.

31. The method of claim 30, wherein determining, with the trained machine-learning model based on the new user record, a set of SKUs and corresponding counts of each SKU in the set of SKUs comprises:

selecting the consumption model from the plurality of consumption models as part of the training.

32. The method of claim 21, further comprising:

determine one or more prompts for user feedback corresponding to attributes different from the at least some attributes included in the new user record;

transmitting the one or more prompts for user feedback to a user device of the user associated with the new user record;

updating the new user record based on received user feedback;

determining a measure of accuracy of current consumption amounts of goods determined for the updated user record based in part on the feedback; and identifying the updated user record to the training set or the validation set based on the measure of accuracy.

33. The method of claim 32, further comprising:

training a new consumption model that reduces error of output determined consumption amounts relative to the current consumption amounts of goods determined for the updated user record; and determining, with the new consumption model based on the updated user record, for a next fulfillment period, an updated predicted consumption amount for each good in the set of goods.

34. The method of claim 33, wherein:

user records identified to the training set comprise historical consumption amounts associated with dates and corresponding geolocations of households of users corresponding to the user records;

the next fulfillment period is associated with at least one date; and the updated predicted consumption amount for each good in the set of goods for the next fulfillment period differs for at least some goods for different dates received as input to the new consumption model.

35. The method of claim 21, wherein:

user records identified to the training set comprise historical consumption amounts associated with dates and corresponding geolocations of households of users corresponding to the user records;

the set of SKUs and corresponding counts of each SKU in the set of SKUs is determined for a fulfillment period associated with at least one date; and the set of SKUs and corresponding counts of each SKU in the set of SKUs for each good in the set of goods for a next fulfillment period differs for at least some goods for different dates received as input to the trained machine-learning model.

36. The method of claim 35, wherein:

the at least one date is a range of dates, the range of dates comprising a number of weekend days and a number of weekdays, and the set of SKUs and corresponding counts of each SKU in the set of SKUs for each good in the set of goods for the next fulfillment period differs for different ratios of weekend days to weekdays.

37. The method of claim 35, wherein:

the at least one date corresponds to a season in a set of seasons, and the set of SKUs and corresponding counts of each SKU in the set of SKUs for each good in the set of goods for the next fulfillment period differs for different seasons in the set of seasons.

38. The method of claim 21, further comprising:

identifying, for a good in the set of goods, a plurality of SKUs or combinations of SKUs having a total count of the good that meets a predicted consumption amount for the good or exceeds the predicted consumption amount for the good within a threshold amount; and identifying, for at least some other goods in the set of goods, a plurality of SKUs or combinations of SKUs having a total count of the good that meets the predicted consumption amount for the good or exceeds the predicted consumption amount for the good within a threshold amount.

39. The method of claim 38, further comprising:

generating, for the set of goods, an order comprising a plurality of SKUs indicated in obtained stock records for which a total count of one or more SKUs corresponding to respective ones of the goods meet the predicted consumption amount for the good without exceeding a threshold; and selecting, for each good in the set of goods, from one or more SKUs identified for the good, a SKU or a combination of SKUs that meets the predicted consumption amount for the good without exceeding a threshold and that, collectively, with other SKUs or combination of SKUs selected for other goods in the set of goods that meet the respective predicted consumption amount without exceeding a respective threshold, satisfy volumetric and weight criteria for order fulfillment.

40. The method of claim 38, further comprising:

updating the user record to include indications of total counts which exceeded the predicted consumption amount for the respective goods, wherein a next fulfilled order includes less than the predicted consumption amount for one or more of the respective goods based on the corresponding excess.

41. The method of claim 21, further comprising:

steps for predicting consumption amounts.

42. A tangible non-transitory computer-readable storage medium comprising computer program instructions that when executed by one or more processors effectuate operations comprising:

obtaining, with a computer system, in a database, a plurality of user records, each record comprising household attributes having corresponding values and consumption amounts for goods;

forming, with the computer system, from the plurality of user records, a training set and a validation set;

training, with the computer system, based on the training set, a consumption model configured to output, based on input values for a set of a plurality of household attributes represented in the training records, determined consumption amounts for respective goods represented in the training records, wherein the model minimizes error of output determined consumption amounts relative to the consumption amounts for goods in at least some of the user records in the validation set;

obtaining, with the computer system, a new user record comprising at least some household attributes having corresponding values;

determining, with the computer system, with the consumption model based on the new user record, a predicted consumption amount for each good in a set of goods;

obtaining, with the computer system, for a good in the set of goods, at least one stock record indicative of at least one stock keeping unit (SKU) having a count of the good that satisfies in whole or in part the predicted consumption amount for the good, wherein at least one SKU is obtained for each good in the set of goods and a combination of SKUs is obtained for at least some of the goods in the set of goods;

generating, with the computer system, for the set of goods, an order comprising a plurality of SKUs indicated in obtained stock records for which a total count of one or more SKUs corresponding to respective ones of the goods meet the predicted consumption amount for the good without exceeding a threshold;

submitting, with the computer system, the generated order for fulfillment;

updating the new user record based on the generated order;

determining a first feedback prompt corresponding to a first good in the set of goods;

updating the new user record based on received user feedback responsive to the prompt;

determining, with the consumption model based on the updated user record, a next predicted consumption amount for each good in a set of goods during a next consumption period;

updating the new user record based on a next generated order submitted for fulfilment for the next consumption period; and determining a second feedback prompt corresponding to a different good in the set of goods based on an amount of change in the next predicted consumption amount for the different good relative to the previously predicted consumption amount, wherein determining a second feedback prompt corresponding to a different good in the set of goods based on an amount of change in the next predicted consumption amount for the different good relative to the previously predicted consumption amount comprises:

determining amounts of change in the next predicted consumption amounts for one or more of the goods in the set different from the first good; and determining to generate the second feedback prompt corresponding to the given one of the different goods based on the amounts of change and the amount of change for the given one of the different goods exceeding a threshold of change.

43. The medium of claim 42, the operations comprising: fulfilling the generated order.

44. The medium of claim 42, the operations further comprising:
determining, based on the plurality of user records, amounts of consumption of different ones of the goods attributable to respective ones of a plurality of household attributes represented in at least some of the records.

45. The medium of claim 44, the operations further comprising:
identifying, for a given good, an attribute or attribute value pairing indicative of a change in an amount of consumption of the given good.

46. The medium of claim 45, the operations further comprising:
scoring, for the given good, the attribute based the change in the amount of consumption of the given good relative to other changes in the amount of consumption of the given good identified for other attributes; and
selecting a given attribute to include in a reduced set of attributes based on a plurality of scores, wherein the at least some attributes in the new user record correspond to the reduced set of attributes.

47. The medium of claim 45, the operations further comprising:
scoring, for the given good, the attribute value pairing based the change in the amount of consumption of the given good relative to other changes in the amount of consumption of the given good identified for other attribute value pairings; and
selecting a reduced set of possible values for the attribute based on a plurality of scores, wherein the at least some attributes in the new user record include the attribute having a value in the reduced set of possible values.

48. The medium of claim 42, wherein determining, with the consumption model based on the new user record, a predicted consumption amount for each good in a set of goods comprises:
forming a plurality of clusters based on the plurality of user records, wherein each cluster comprises at least some user records identified to the cluster based on their respective values for the at least some household attributes;
determining, based on the respective values of the at least some attributes in the new user record and respective values representative of the at least some attributes of at least some of the clusters, distances between the user record and the at least some of the clusters to identify a closest one of the clusters based on the distances; and
adding, to the at least some of the attributes, other attributes with corresponding values based on user records in the closest one of the clusters.

49. The medium of claim 42, wherein:
the at least some of the household attributes is a reduced set of attributes for which corresponding values are obtained in association with registering a new user corresponding to the new user record, and
values for at least some other attributes are determined for the user record prior to determining the predicted consumption amount for each good in a set of goods based on the new user record.

50. The medium of claim 42, the operations further comprising:
training a plurality of consumption models;
determining that a given one of the consumption models reduces error of output determined consumption amounts relative to the consumption amounts for goods in at least some different collections of user records in the validation set, wherein the different collections of user records correspond to different clusters of user records; and
determining, based on the respective values of the at least some household attributes in the new user record and respective values representative of the at least some attributes of the different clusters, distances between the user record and the different clusters to identify a closest one of the clusters based on the distances.

51. The medium of claim 50, the operations further comprising:
selecting the consumption model from the plurality of consumption models as part of the training.

52. The medium of claim 42, the operations further comprising:
determining a measure of accuracy of current consumption amounts of goods determined for the updated user record based in part on the received feedback; and
identifying the updated user record to the training set or the validation set based on the measure of accuracy.

53. The medium of claim 52, the operations further comprising:
training a new consumption model that reduces error of output determined consumption amounts relative to the current consumption amounts of goods determined for the updated user record; and
determining, with the new consumption model based on the updated user record, for a next fulfillment period, an updated predicted consumption amount for each good in the set of goods.

54. The medium of claim 53, wherein:
user records identified to the training set comprise historical consumption amounts associated with dates and corresponding geolocations of households of users corresponding to the user records;
the next fulfillment period is associated with at least one date; and
the updated predicted consumption amount for each good in the set of goods for the next fulfillment period differs for at least some goods for different dates received as input to the new consumption model.

55. The medium of claim 42, wherein:
user records identified to the training set comprise historical consumption amounts associated with dates and corresponding geolocations of households of users corresponding to the user records;

the predicted consumption amount for each good in a set of goods is determined for a fulfillment period associated with at least one date; and the predicted consumption amount for each good in the set of goods for the next fulfillment period differs for at least some goods for different dates received as input to the consumption model.

56. The medium of claim 55, wherein:

the at least one date is a range of dates, the range of dates comprising a number of weekend days and a number of weekdays, and the predicted consumption amount for each good in the set of goods for the next fulfillment period differs for different ratios of weekend days to weekdays.

57. The medium of claim 55, wherein:

the at least one date corresponds to a season in a set of seasons, and the predicted consumption amount for each good in the set of goods for the next fulfillment period differs for different seasons in the set of seasons.

58. The medium of claim 42, the operations further comprising:

identifying, for a good in the set of goods, a plurality of SKUs or combinations of SKUs having a total count of the good that meets a predicted consumption amount for the good or exceeds the predicted consumption amount for the good within a threshold amount; and identifying, for at least some other goods in the set of goods, a plurality of SKUs or combinations of SKUs having a total count of the good that meets the predicted consumption amount for the good or exceeds the predicted consumption amount for the good within a threshold amount.

59. The medium of claim 58, wherein generating, for the set of goods, an order comprising a plurality of SKUs indicated in obtained stock records for which a total count of one or more SKUs corresponding to respective ones of the goods meet the predicted consumption amount for the good without exceeding a threshold comprises:

selecting, for each good in the set of goods, from one or more SKUs identified for the good, a SKU or a combination of SKUs that meets the predicted consumption amount for the good without exceeding a threshold and that, collectively, with other SKUs or combination of SKUs selected for other goods in the set of goods that meet the respective predicted consumption amount without exceeding a respective threshold, satisfy volumetric and weight criteria for order fulfillment.

60. The medium of claim 58, further comprising:

updating the user record to include indications of total counts which exceeded the predicted consumption amount for the respective goods, wherein a next fulfilled order includes less than the predicted consumption amount for one or more of the respective goods based on the corresponding excess.

61. The medium of claim 42, the operations further comprising:

steps for predicting consumption amounts.

* * * * *